US007460832B2

(12) United States Patent
Lee et al.

(10) Patent No.: US 7,460,832 B2
(45) Date of Patent: Dec. 2, 2008

(54) METHODS AND APPARATUSES FOR MINIMIZING CO-CHANNEL INTERFERENCE

(75) Inventors: Lin-Nan Lee, Potomac, MD (US); Feng-Wen Sun, Germantown, MD (US); Adam Von Ancken, New Market, MD (US); Joseph Santoru, Agoura Hills, CA (US); Ernest C. Chen, San Pedro, CA (US); Shamik Maitra, Redondo Beach, CA (US); Dennis Lai, Cerritos, CA (US); Guangcai Zhou, Agoura Hills, CA (US); Tung-Sheng Lin, Claremont, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 307 days.

(21) Appl. No.: 11/103,307

(22) Filed: Apr. 11, 2005

(65) Prior Publication Data

US 2005/0226414 A1    Oct. 13, 2005

Related U.S. Application Data

(60) Provisional application No. 60/561,418, filed on Apr. 12, 2004.

(51) Int. Cl.
*H04B 15/00* (2006.01)
*H03D 1/04* (2006.01)

(52) U.S. Cl. .............................. 455/63.1; 455/1; 455/39; 455/296; 455/302; 455/295; 375/254; 375/285; 375/346; 375/353; 375/296; 375/308; 725/63; 725/100

(58) Field of Classification Search .................. 455/63.1
See application file for complete search history.

(56) References Cited

U.S. PATENT DOCUMENTS

| 5,235,619 | A | 8/1993 | Beyers, II et al. |
| 5,305,384 | A | 4/1994 | Ashby et al. |
| 5,321,754 | A | 6/1994 | Fisher et al. |
| 5,327,455 | A | 7/1994 | De Gaudenzi et al. |
| 5,506,903 | A | 4/1996 | Yamashita |
| 5,710,797 | A | 1/1998 | Segal et al. |

(Continued)

FOREIGN PATENT DOCUMENTS

CN    1728622    2/2006

(Continued)

OTHER PUBLICATIONS

Written Opinion of the International Searching Authority in International Application No. PCT/US05/12280, U.S. Appl. No. 11/103,307, filed Apr. 11, 2005.

(Continued)

*Primary Examiner*—Nasser Moazzami
*Assistant Examiner*—Ronald Baum

(57) ABSTRACT

Methods and apparatuses for minimizing co-channel interference in communications systems are disclosed. A method in accordance with the present invention comprises scrambling a first frame using a first scrambling code, attaching a first header to the first frame to create the first signal, scrambling a second frame using a second scrambling code, attaching a second header to the second frame to create the second signal, and transmitting the first signal and the second signal over different channels of the communication system.

20 Claims, 15 Drawing Sheets

U.S. PATENT DOCUMENTS

| | | | |
|---|---|---|---|
| 5,825,889 A * | 10/1998 | Dent | 380/270 |
| 5,838,740 A | 11/1998 | Kallman et al. | |
| 6,144,711 A | 11/2000 | Raleigh et al. | |
| 6,154,454 A | 11/2000 | Abe | |
| 6,201,499 B1 | 3/2001 | Hawkes et al. | |
| 6,201,798 B1 | 3/2001 | Campanella et al. | |
| 6,304,618 B1 | 10/2001 | Hafeez et al. | |
| 6,324,159 B1 | 11/2001 | Mennekens et al. | |
| 6,400,761 B1 | 6/2002 | Smee et al. | |
| 6,452,991 B1 | 9/2002 | Zak | |
| 6,549,782 B2 | 4/2003 | Roy | |
| 6,574,235 B1 | 6/2003 | Arslan et al. | |
| 6,618,367 B1 | 9/2003 | Riazi et al. | |
| 6,853,633 B1 | 2/2005 | Ramesh | |
| 6,917,861 B2 | 7/2005 | Klu | |
| 7,002,900 B2 | 2/2006 | Walton et al. | |
| 7,016,319 B2 | 3/2006 | Baum et al. | |
| 7,039,024 B2 | 5/2006 | Nefedov | |
| 7,124,303 B2 * | 10/2006 | Candelore et al. | 713/193 |
| 7,154,846 B2 | 12/2006 | Chen et al. | |
| 7,161,988 B2 | 1/2007 | Lee et al. | |
| 7,174,452 B2 * | 2/2007 | Carr | 713/151 |
| 7,177,598 B2 | 2/2007 | Klein et al. | |
| 7,248,841 B2 | 7/2007 | Agee et al. | |
| 7,292,606 B2 * | 11/2007 | Li | 370/491 |
| 2001/0055311 A1 * | 12/2001 | Trachewsky et al. | 370/445 |
| 2001/0055319 A1 | 12/2001 | Quigley et al. | |
| 2002/0041635 A1 | 4/2002 | Ma et al. | |
| 2002/0044614 A1 | 4/2002 | Molnar et al. | |
| 2002/0154620 A1 | 10/2002 | Azencot et al. | |
| 2002/0172264 A1 | 11/2002 | Wiberg et al. | |
| 2003/0185174 A1 | 10/2003 | Currivan et al. | |
| 2004/0136455 A1 | 7/2004 | Akhter et al. | |
| 2004/0153942 A1 | 8/2004 | Shtutman et al. | |
| 2004/0161031 A1 | 8/2004 | Kwentus et al. | |
| 2004/0178934 A1 * | 9/2004 | Balakrishnan et al. | 341/80 |
| 2004/0244059 A1 | 12/2004 | Coman | |
| 2004/0255229 A1 | 12/2004 | Shen et al. | |
| 2005/0226414 A1 | 10/2005 | Lee et al. | |
| 2005/0226418 A1 | 10/2005 | Lee et al. | |
| 2005/0229230 A1 | 10/2005 | Santoru et al. | |
| 2005/0286405 A1 | 12/2005 | Sun et al. | |
| 2006/0227894 A1 | 10/2006 | Lee et al. | |

FOREIGN PATENT DOCUMENTS

| | | |
|---|---|---|
| EP | 1037481 | 9/2000 |
| JP | 2001237752 | 8/2001 |
| JP | 2003339030 | 11/2003 |
| WO | WO 98/49857 | 11/1998 |
| WO | WO 00/27049 | 5/2000 |
| WO | WO 01/05050 | 1/2001 |
| WO | WO 03/094520 | 11/2003 |

OTHER PUBLICATIONS

Written Opinion of the International Searching Authority in International Application No. PCT/US05/12279, U.S. Appl. No. 11/102,983, filed Apr. 11, 2005.

Written Opinion of the International Searching Authority in International Application No. PCT/US05/12278, U.S. Appl. No. 11/102,958, filed Apr. 11, 2005.

Written Opinion of the International Searching Authority in International Application No. PCT/US05/18564, U.S. Appl. No. 11/009,333, filed Dec. 10, 2004.

Written Opinion of the International Searching Authority in International Application No. PCT/US05/12424, U.S. Appl. No. 11/009,346, filed Dec. 10, 2004.

Korean Office Communication dated Oct. 29, 2007 in Korean counterpart application No. 10-2006-7023650 of U.S. Appl. No. 11/102,983, filed Apr. 11, 2005.

EPO Communication dated Nov. 15, 2007 in counterpart European patent application No. 05735282.5 in related U.S. Appl. No. 11/102,958, filed Apr. 11, 2005.

Naguleswaran, S., Rice, M., Schroeder, J.E.; "Channel Compensation Techniques in a Receiver with Adaptive MAI Suppressions"; 2002; IEEE (0-7803-7576-9/02); entire document; http://ieeexplore.ieee.org/iel5/8521/26928/01197156.pdf.

U.S. Appl. No. 11/102,983, filed Apr. 11, 2005, Joseph Santoru, Notice of Allowance dated Jan. 14, 2008.

Notice of Allowance dated Mar. 8, 2006 in U.S. Appl. No. 11/009,346 filed Dec. 10, 2004 by Lin-Nan Lee et al., now issued as U.S. Patent 7,161,988 on Jan. 9, 2007.

Non-final Office Action dated Mar. 27, 2008 in U.S. Appl. No. 11/102,958 filed Apr. 11, 2005 by Lin-Nan Lee et al.

Korean Office Action dated Mar. 28, 2008 in Korean counterpart Application No. 10-2007-7002090 corresponding to U.S. Appl. No. 11/009,333 filed Dec. 10, 2004 by Feng-Wen Sun et al.

Ponnampalam, Vishakan and Jones, Alan E.; "On Cell Parameter ID Assignment in Ultra-TDD"; Personal, Indoor and Mobile Radio Communications; 2004; PIMRC 2004; 15th IEEE International Symposium; Barcelona, Spain; Sep. 5-8, 2004; Piscataway, New Jersey USA; vol. 3; pp. 2051-2054; XP010754293; ISBN; 0-7803-8523-3; Section III and Section IV.

Al-Meshhadany, Thamer and Al Agha, Khaldoun; "Analysis of the Code Allocation Mechanism in the WCDMA"; Mobile and Wireless Communications Network; 2002; 4th International Workshop; Sep. 9-11, 2002; Piscataway, New Jersey USA; pp. 196-199; XP010611845; ISBN: 0-7803-7605-6; pp. 196-197.

Non-final Office Action dated Nov. 14, 2005 in U.S. Appl. No. 11/009,346 filed Dec. 10, 2004 by Lin-Nan Lee et al., now issued as U.S. Patent No. 7,161,988 on Jan. 9, 2007.

Non-final Office Action dated Mar. 18, 2008 in U.S. Appl. No. 11/449,912 filed Jun. 09, 2006 by Lin-Nan Lee et al.

Non-final Office Action dated Aug. 28, 2008 in U.S. Appl. No. 11/009,333 filed Dec. 10, 2004 by Feng-Wen Sun et al.

Chinese Office Action dated Aug. 15, 2008 in Chinese counterpart Application No. 200580018562.8 Corresponding to U.S. Appl. No. 11/102,958 filed Apr. 11, 2005 by Lin-Nan Lee et al.

Notice of Allowance dated Sep. 30, 2008 in U.S. Appl. No. 11/102,958 filed Apr. 11, 2005 by Lin-Nan Lee et al.

* cited by examiner

METHODS AND APPARATUSES FOR MINIMIZING CO-CHANNEL INTERFERENCE

CROSS REFERENCE TO RELATED APPLICATION

This application claims the benefit of the earlier filing date under 35 U.S.C. § 119(e) of U.S. Provisional Application Ser. No. 60/561,418 filed Apr. 12, 2004, entitled "Co-channel Interference Mitigation for DVB-S2," the entirety of which are incorporated herein by reference.

This application is also related to the following commonly assigned applications:

U.S. patent application Ser. No. 11/449,912, filed on Jun. 9, 2006 by Lin-Nan Lee et al., entitled "METHOD AND APPARATUS FOR MINIMIZING CO-CHANNEL INTERFERENCE";

U.S. patent application Ser. No. 11/009,346, filed on Dec. 10, 2004 by Lin-Nan Lee et al., entitled "METHOD AND APPARATUS FOR MINIMIZING CO-CHANNEL INTERFERENCE," now U.S. Pat. No. 7,161,988;

U.S. patent application Ser. No. 11/009,333, filed on Dec. 10, 2004 by Feng-Wen Sun et al., entitled "METHOD AND APPARATUS FOR MINIMIZING CO-CHANNEL INTERFERENCE BY SCRAMBLING";

U.S. patent application Ser. No. 11/102,958, filed on Apr. 11, 2005 by Lin-Nan Lee et al., entitled "PHYSICAL LAYER HEADER SCRAMBLING IN SATELLITE BROADCAST SYSTEMS"; and U.S. patent application Ser. No. 11/102,983, filed on Apr. 11, 2005 by Joseph Santoru et al., entitled "SHIFTED CHANNEL CHARACTERISTICS FOR MITIGATING CO-CHANNEL INTERFERENCE."

BACKGROUND OF THE INVENTION

1. Field of the Invention

The present invention relates to communication systems, and more particularly to methods and apparatuses for minimizing signal interference.

2. Description of the Related Art

FIGS. 1A and 1B illustrate a typical satellite based broadcast systems of the related art.

FIG. 1A shows a communications system, specifically a television broadcasting system 20, which transmits and receives audio, video, and data signals via satellite. Although the present invention is described in the context of a satellite-based television broadcasting system, the techniques described herein are equally applicable to other methods of program content delivery, such as terrestrial over-the-air systems, cable-based systems, and the Internet. Further, while the present invention will be described primarily with respect to television content (i.e. audio and video content), the present invention can be practiced with a wide variety of program content material, including video content, audio content, audio and video related content (e.g., television viewer channels), or data content.

Television broadcasting system 20 includes transmission station 26, uplink dish 30, at least one satellite 32, and receiver stations 34A-34C (collectively referred to as receiver stations 34). Transmission station 26 includes a plurality of inputs 22 for receiving various signals, such as analog television signals, digital television signals, video tape signals, original programming signals and computer generated signals containing HTML content. Additionally, inputs 22 receive signals from digital video servers having hard discs or other digital storage media. Transmission station 26 also includes a plurality of timing inputs 24, which provide electronic schedule information about the timing and content of various television channels, such as that found in television schedules contained in newspapers and television guides. Transmission station 26 converts the data from timing inputs 24 into program guide data. Program guide data may also be manually entered at the site of transmission station 26. The program guide data consists of a plurality of "objects". The program guide data objects include data for constructing an electronic program guide that is ultimately displayed on a user's television.

Transmission station 26 receives and processes the various input signals received on inputs 22 and timing inputs 24, converts the received signals into a standard form, combines the standard signals into a single output data stream 28, and continuously sends output data stream 28 to uplink dish 30. Output data stream 28 is a digital data stream that is typically compressed using MPEG2 encoding, although other compression schemes may be used.

The digital data in output data stream 28 are divided into a plurality of packets, with each such packet marked with a service channel identification (SCID) number. The SCIDs are later used by receiver 64 (shown in FIG. 1B) to identify the packets that correspond to each television channel. Error correction data is also included in output data stream 28.

Output data stream 28 is a multiplexed signal that is modulated by transmission station 26 using standard frequency and polarization modulation techniques. Output data stream 28 preferably includes 16 frequency bands, with each frequency band being either left polarized or right polarized. Alternatively, vertical and horizontal polarizations may be used.

Uplink dish 30 continuously receives output data stream 28 from transmission station 26, amplifies the received signal and transmits the signal 31 to at least one satellite 32. Although a single uplink dish and satellite are shown in FIG. 1, multiple dishes and satellites are preferably used to provide additional bandwidth, and to help ensure continuous delivery of signals.

Satellites 32 revolve in geosynchronous orbit about the earth. Satellites 32 each include a plurality of transponders that receive signals 31 transmitted by uplink dish 30, amplify the received signals 31, frequency shift the received signals 31 to lower frequency bands, and then transmit the amplified, frequency shifted signals 33 back to receiver stations 34.

Receiver stations 34 receive and process the signals 33 transmitted by satellites 32. Receiver stations 34 are described in further detail below with respect to FIG. 1B.

FIG. 1B is a block diagram of one of receiver stations 34, which receives and decodes audio, video and data signals. Typically, receiver station 34 is a "set top box," also known as an Integrated Receiver Decoder (IRD), which is usually resident in a home or multi-dwelling unit, for reception of satellite broadcasted television signals. Receiver dish 60 can be an Outdoor Unit (ODU), which is usually a smaller dish antenna mounted on a home or multi-dwelling unit. However, receiver dish 60 can also be a larger ground-mounted antenna dish if desired.

Receiver station 34 includes receiver dish 60, alternate content source 62, receiver 64, monitor 66, recording device 68, remote control 86 and access card 88. Receiver 64 includes tuner 70/demodulator/Forward Error Correction (FEC) decoder 71, digital-to-analog (D/A) converter 72, CPU 74, clock 76, memory 78, logic circuit 80, interface 82, infrared (IR) receiver 84 and access card interface 90. Receiver dish 60 receives signals 33 sent by satellite 32, amplifies the signals 33 and passes the signals 33 on to tuner 70. Tuner 70 and demodulator/FEC decoder 71 operate under control of CPU 74.

The CPU 74 operates under control of an operating system stored in the memory 78 or within an auxiliary memory within the CPU 74. The functions performed by CPU 74 are controlled by one or more control programs or applications stored in memory 78. Operating system and applications are comprised of instructions which, when read and executed by the CPU 74, cause the receiver 64 to perform the functions and steps necessary to implement and/or use the present invention, typically, by accessing and manipulating data stored in the memory 78. Instructions implementing such applications are tangibly embodied in a computer-readable medium, such as the memory 78 or the access card 88. The CPU 74 may also communicate with other devices through interface 82 or the receiver dish 60 to accept commands or instructions to be stored in the memory 78, thereby making a computer program product or article of manufacture according to the invention. As such, the terms "article of manufacture," "program storage device" and "computer program product" as used herein are intended to encompass any application accessible by the CPU 74 from any computer readable device or media.

Memory 78 and access card 88 store a variety of parameters for receiver 64, such as a list of channels receiver 64 is authorized to process and generate displays for; the zip code and area code for the area in which receiver 64 is used; the model name or number of receiver 64; a serial number of receiver 64; a serial number of access card 88; the name, address and phone number of the owner of receiver 64; and the name of the manufacturer of receiver 64.

Access card 88 is removable from receiver 64 (as shown in FIG. 1B). When inserted into receiver 64, access card 88 is coupled to access card interface 90, which communicates via interface 82 to a customer service center (not pictured). Access card 88 receives access authorization information from the customer service center based on a user's particular account information. In addition, access card 88 and the customer service center communicate regarding billing and ordering of services.

Clock 76 provides the current local time to CPU 74. Interface 82 is preferably coupled to a telephone jack 83 at the site of receiver station 34. Interface 82 allows receiver 64 to communicate with transmission station 26 as shown in FIG. 1A via telephone jack 83. Interface 82 may also be used to transfer data to and from a network, such as the Internet.

The signals sent from receiver dish 60 to tuner 70 are a plurality of modulated Radio Frequency (RF) signals. The desired RF signal is then downconverted to baseband by the tuner 70, which also generates in-phase and quadrature (I and Q) signals. These two signals are then passed to the demodulator/FEC Application Specific Integrated Circuit (ASIC) 71. The demodulator 71 ASIC then demodulates the I and Q signals, and the FEC decoder correctly identifies each transmitted symbol. The received symbols for Quaternary Phase Shift Keying (QPSK) or 8PSK signals carry two or three data bits, respectively. The corrected symbols are translated into data bits, which in turn are assembled in to payload data bytes, and ultimately into data packets. The data packets may carry 130 data bytes or 188 bytes (187 data bytes and 1 sync byte).

In addition to the digital satellite signals received by receiver dish 60, other sources of television content are also preferably used. For example, alternate content source 62 provides additional television content to monitor 66. Alternate content source 62 is coupled to tuner 70. Alternate content source 62 can be an antenna for receiving off the air signals National Television Standards Committee (NTSC) signals, a cable for receiving American Television Standards Committee (ATSC) signals, or other content source. Although only one alternate content source 62 is shown, multiple sources can be used.

Initially, as data enters receiver 64, CPU 74 looks for initialization data which is referred to commonly in the industry as a boot object. A boot object identifies the SCIDs where all other program guide objects can be found. Boot objects are always transmitted with the same SCID, so CPU 74 knows that it must look for packets marked with that SCID. The information from the boot object is used by CPU 74 to identify packets of program guide data and route them to memory 78.

Remote control 86 emits Infrared (IR) signals 85 that are received by infrared receiver 84 in receiver 64. Other types of data entry devices may alternatively be used, by way of example and not limitation, such as an ultra-high frequency (UHF) remote control, a keypad on receiver 64, a remote keyboard and a remote mouse. When a user requests the display of a program guide by pressing the "guide" button on remote control 86, a guide request signal is received by IR receiver 84 and transmitted to logic circuit 80. Logic circuit 80 informs CPU 74 of the guide request. In response to the guide request, CPU 74 causes memory 78 to transfer a program guide digital image to D/A converter 72. D/A converter 72 converts the program guide digital image into a standard analog television signal, which is then transmitted to monitor 66. Monitor 66 then displays the TV video and audio signals. Monitor 66 may alternatively be a digital television, in which case no digital to analog conversion in receiver 64 is necessary.

Users interact with the electronic program guide using remote control 86. Examples of user interactions include selecting a particular channel or requesting additional guide information. When a user selects a channel using remote control 86, IR receiver 84 relays the user's selection to logic circuit 80, which then passes the selection on to memory 78 where it is accessed by CPU 74. CPU 74 performs an MPEG2 decoding step on received audio, video, and other packets from FEC decoder 71 and outputs the audio and video signals for the selected channel to D/A converter 72. D/A converter 72 converts the digital signals to analog signals, and outputs the analog signals to monitor 66.

Such communications systems 20, here by example which is shown a television broadcast system 20, have embraced the demand for high quality transmissions made possible by digital technology. As the packets and other data are transmitted from uplink dish 30 to receiver 64, the symbols and bits in packets intended for other receiver stations 34 are typically transmitted down from satellite 32 to receiver 64 on the same frequency, because the transmit frequency is controlled by the limitations of satellites 32, and the transmit frequencies that are available are controlled by government permission for transmission at specific frequencies within the frequency spectrum.

Further, the data frames are coded in such a manner that they can interfere with each other, and receiver 64 cannot tell which packets of data that receiver 64 is supposed to decode and present on monitor 66. Such interference is called "co-channel" interference, where one channel of data interferes with the reception and demodulation of another channel of data. In practical applications, the co-channel interference may also stem from transmission of other system operators, a satellite 32 operating in an adjacent orbital slot, or other spot transmission beams in a spot beam satellite broadcasting system 20.

As communications systems 20 transmits more data, i.e., more channels of programming on a satellite broadcast system that are viewable on monitor 66, the interference between data packets will increase, and, as such, the quality of the signal reception will be poorer.

To make optimal use of the available spectrum and to deliver a high number of different channels of programming, rf transmissions with the same frequencies may be directed to different geographic areas. However in areas bordering the different service areas, it is possible that a receiving station may detect a wanted transmission, but also other co-frequency transmissions. The unwanted transmissions are interference and may severely degrade the overall performance of the wanted channel receiver.

Traditionally, the negative effects of co-channel interference have been minimized by redesigning the frequency assignments assigned to the various transponders or satellites 32. But this will not alleviate the problem beyond a certain point.

It can be seen, then, that there is a need in the art to minimize the interference in a broadcasting system.

SUMMARY OF THE INVENTION

To minimize the limitations in the prior art, and to minimize other limitations that will become apparent upon reading and understanding the present specification, the present invention discloses methods and apparatuses for minimizing co-channel interference in communications systems. A method in accordance with the present invention comprises scrambling a first frame using a first scrambling code, attaching a first header to the first frame to create the first signal, scrambling a second frame using a second scrambling code, attaching a second header to the second frame to create the second signal, and transmitting the first signal and the second signal over different channels of the communication system.

Optional additional elements further include the first header being attached to the first frame prior to using the first scrambling code, the second header being attached to the second frame after scrambling the second frame using the second scrambling code, scrambling the first header using a third scrambling code and scrambling the second header using a fourth scrambling code, the first scrambling code and the second scrambling code being Gold codes, the third scrambling code and the fourth scrambling code being selected from a limited number of codes, the first header containing a first Start-Of-Frame (SOF) portion and the second header contains a second SOF portion different than the first SOF portion, the first SOF portion and the second SOF portion being selected from a limited number of SOF portions, the first frame comprising a first pilot symbol and the second frame comprising a second pilot symbol, the first pilot symbol being scrambled with the header, the first scrambling code being generated from a first seed and the second scrambling code being generated from a second seed, the first seed and the second seed being selected from a limited number of seeds, the number of seeds being determined based on a number of interfering channels within the communication system, and transmitting information associated with the first scrambling code and the second scrambling code to a receiver within the communication system. The method can also be performed by a computer-readable medium bearing instructions for minimizing co-channel interference in a communication system, said instruction, being arranged, upon execution, to cause one or more processors to execute the method.

An apparatus in accordance with the present invention comprises a scrambler for scrambling at least a first data frame of the first signal using a first scrambling code and for scrambling at least a second data frame of the second signal using a second scrambling code, and a transmitter for transmitting the first signal and the second signal over different channels of the communication system.

The apparatus optionally includes the first signal further comprising a first header and the second signal further comprises a second header, and the first header and the second header are also scrambled by the scrambler, the first header is scrambled using a third scrambling code and the second header is scrambled using a fourth scrambling code, the third scrambling code and the fourth scrambling code are selected from a limited number of scrambling codes, the first header containing a first Start-Of-Frame (SOF) portion and the second header contains a second SOF portion different than the first SOF portion, and the first SOF portion and the second SOF portion are selected from a limited number of SOF portions.

Still other aspects, features, and advantages of the present invention are inherent in the systems and methods claimed and disclosed or will be apparent from the following detailed description and attached drawings. The detailed description and attached drawings merely illustrate particular embodiments and implementations of the present invention, however, the present invention is also capable of other and different embodiments, and its several details can be modified in various respects, all without departing from the spirit and scope of the present invention. Accordingly, the drawings and description are to be regarded as illustrative in nature, and not as a restriction on the present invention.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF THE PREFERRED EMBODIMENT

Figure 1A:
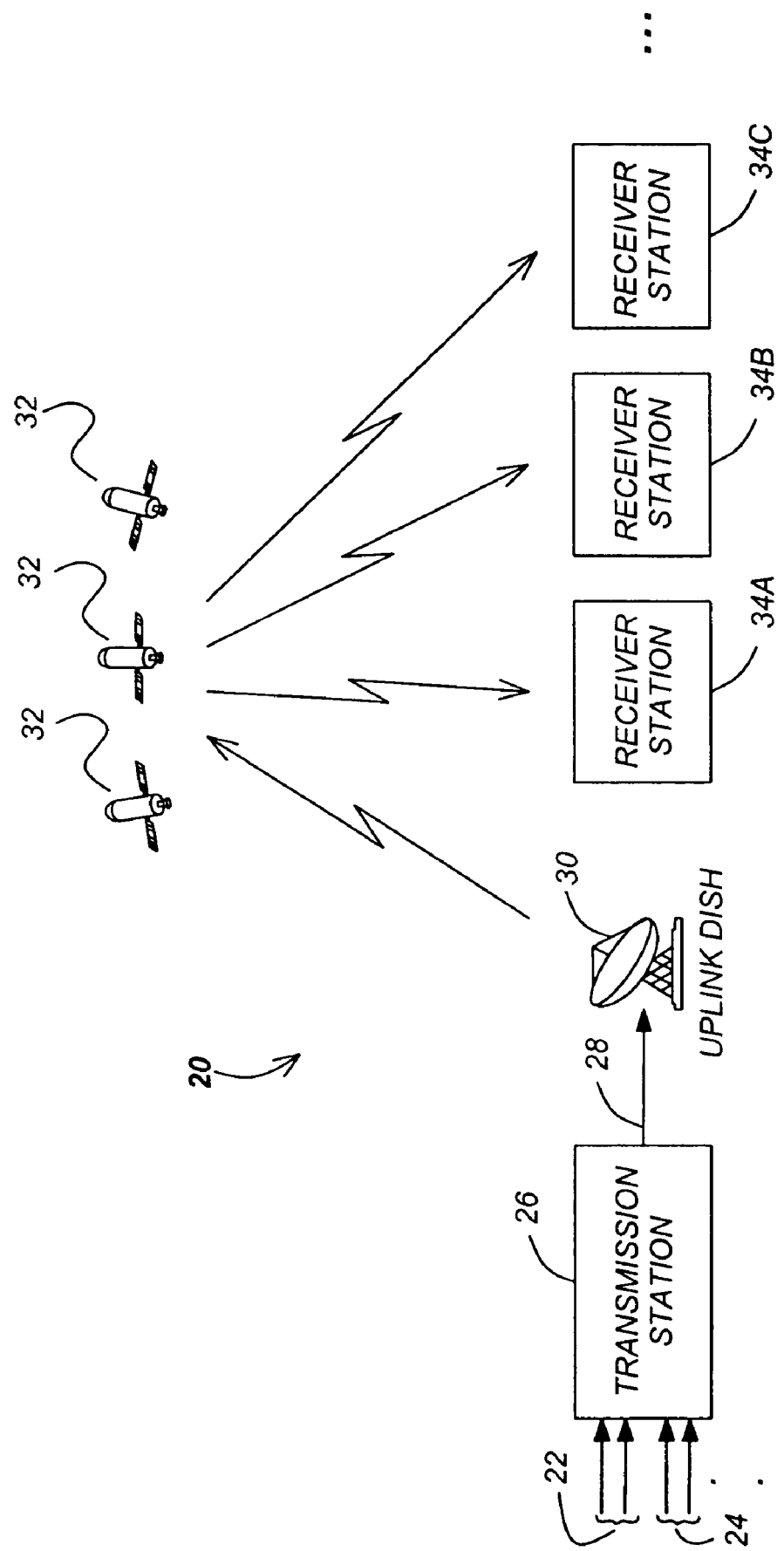
FIGS. 1A and 1B illustrate a typical satellite based broadcast systems of the related art.

An apparatus, method, and software for reducing co-channel interference in a digital broadcast and interactive system are described. In the following description, reference is made to the accompanying drawings which form a part hereof, and which show, by way of illustration, several embodiments of the present invention. It is understood that other embodiments may be utilized and structural changes may be made without departing from the scope of the present invention.

Overview

In the present invention, the digital data transmitted from transmission station 26 via signal 31, satellites 32, and signal 33 contains three main components: a header portion of a data frame, called the physical layer header, or PL header, and payload data, and optionally, additional inserted symbols, called pilot symbols, which are used by the receiver 64 to mitigate the deleterious effects of degradation in the receiver station 34, primarily phase noise. By using the PL header, the demodulator/FEC-decoder 71 can quickly acquire the correct phase at the beginning of every data frame. For many 8PSK and QPSK transmission modes, pilot symbols are also needed to track the phase noise more accurately. However, in certain instances, when the PL headers for a desired signal and an interfering co-frequency signal align in time, the interference is so great that the demodulator/FEC-decoder 71 cannot determine with necessary accuracy the phase of the carrier frequency associated with the wanted signal. This means that as the demodulator 71 tries to maintain a phase lock on the desired signal, the undesired signal presents the same header symbols or pilot symbols, and the demodulator 71 can be confused by the presence of the undesired signal, and therefore unable to track the phase of the desired signal. Such confusion in the demodulator 71 is known in the art as having the demodulator 71 being "pulled off" of the desired signal. If the demodulator 71 is pulled by 45 degrees from the optimal constellation point for a QPSK transmission, the demodulator will not identify the symbols correctly. This will introduce errors, and if not rectified quickly, the data errors will be identified as a loss of lock. This, in turn, will lead the microprocessor 74 to command the demodulator 71 to reacquire the signal, which leads to loss of data until the desired signal is reacquired. Such a loss of data would present incorrect data on monitor 66, and possibly a service interruption on monitor 66 as viewed by a viewer. Rather than viewing a desired television channel with motion and dialog on a given monitor 66, the co-channel interference would cause the viewer to see the monitor fade to a dark screen, or see a garbled picture, or hear garbled audio. It is apparent that co-channel interference can create deleterious effects on a television broadcast system 20.

The present invention provides several factors that will mitigate the effect of such co-channel interference.

A first approach is to provide a different Start-Of-Frame (SOF) sequence and/or scrambling code to those channels that may be affected by such co-channel interference. The demodulator 71 can then look for a specific SOF when asked to tune to one or the other of the data frames, and be able to tell the difference between them. Alternatively, or in conjunction, the codes used to scramble such interfering signals can be sufficiently different that the cross-correlation between the two data frames is reduced to the point where the demodulator 71 can lock onto the desired transmission and disregard the deleterious effect of the interfering channel. Further, different scrambling techniques can be used for PL Headers on different channels, and/or different scrambling techniques or codes can be applied to the payload data, either in conjunction with scrambling of the PL Headers or separate from the PL Headers, which will reduce or eliminate the pulling-off effect.

Another method to reduce co-channel interference effects is to sense when a demodulator 71 is being drawn away from tracking a specific phase of a given signal. Such a drawing away, or "pulling off" of the phase track would indicate the presence of the interfering data frame, and the demodulator 71 can then choose not to update the phase track from the PL header or the pilot symbols.

Another method of the present invention is to offset the transmission frequency of the modulated rf signal by a small amount, e.g., 1 MHz, so the demodulator 71 can search for the SOF portion of the PL header in a different frequency space for a given data frame. The number of offsets, and in which direction, e.g., either up or down in terms of frequency, can be based on the number of independent rf transmissions, or satellite 32 downlink beams, that will be present simultaneously and potentially causing the co-channel interference. Further, the data frames within a signal can also be offset in terms of time, e.g., one data frame starts first, and the interfering data frame is delayed by a certain number of symbols, such that the SOF portion of the PL header will occur at different times for each of the data frames. This will allow the demodulator 71 to know which of the data frames has been received based on the known offset for the data frames, and then demodulate the proper signal.

Another method of the present invention is to use different shift key modes within each of the data frames. Typically, a QPSK transmission mode will be more resistant to co-channel interference effects than an 8PSK transmission mode.

System Diagram

Figure 1B:
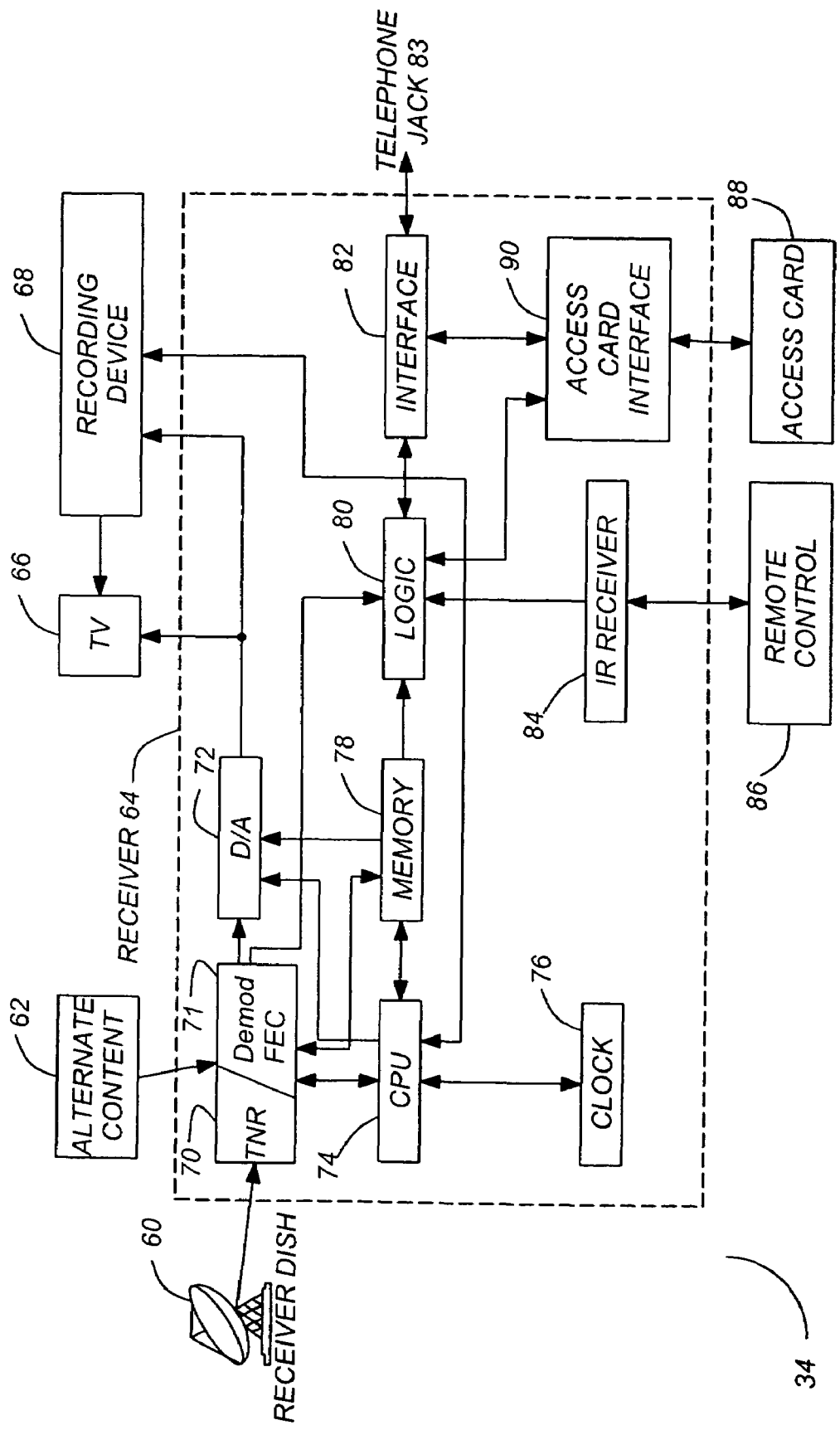
Figure 2A:
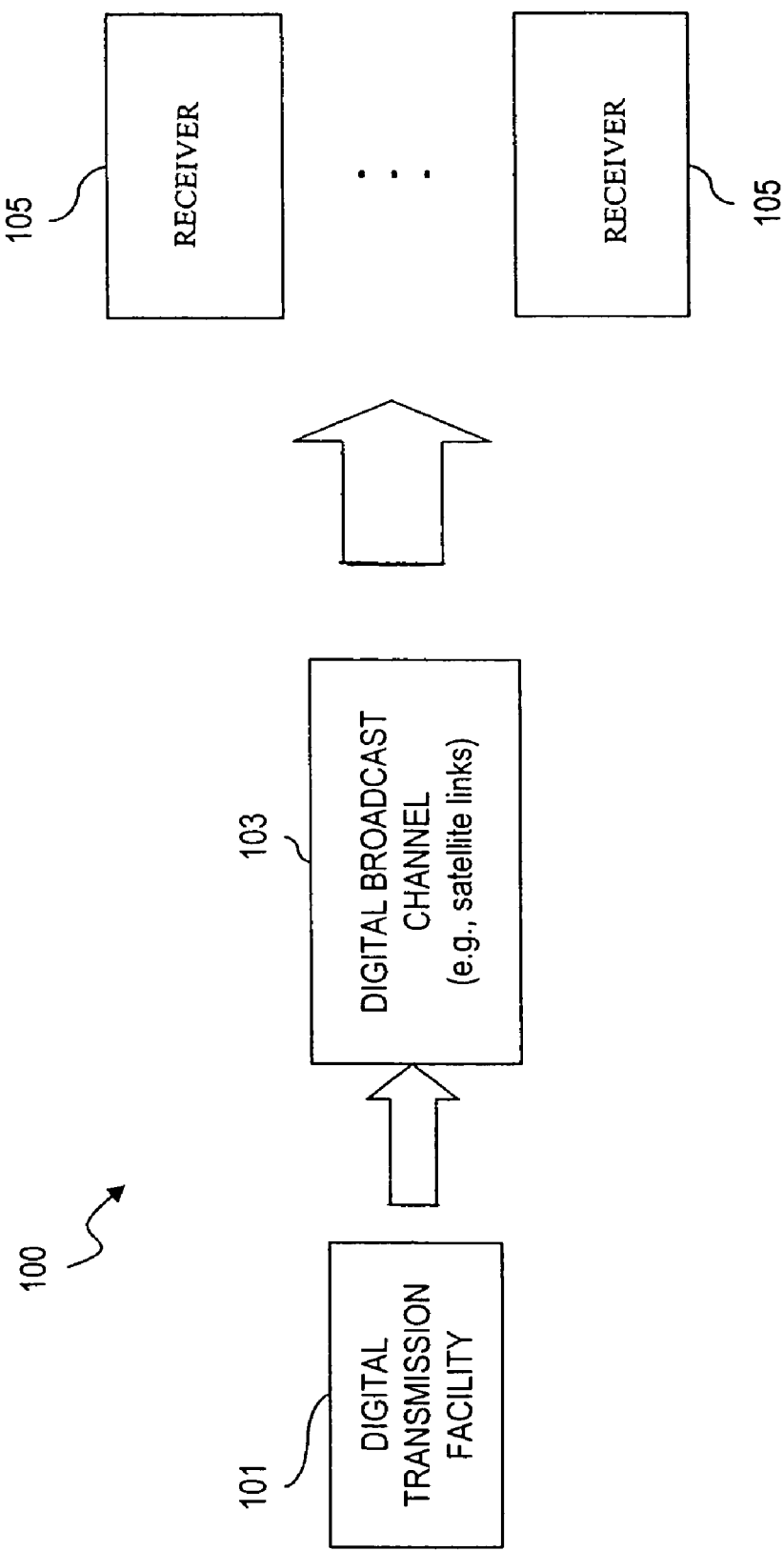
FIG. 2A is a diagram of a digital broadcast system capable of minimizing co-channel interference, according to an embodiment of the present invention.

FIG. 2A is a diagram of a digital broadcast system 100 capable of minimizing co-channel interference, according to an embodiment of the present invention. The digital communications system 100 includes a digital transmission facility 101 that generates signal waveforms for broadcast across a communication channel 103 to one or more receivers 105. According to one embodiment of the present invention, the communication system 100 is a satellite communication system that supports, for example, audio and video broadcast services as well as interactive services. Such a communications system is shown in FIGS. 1A and 1B, and described hereinabove. Interactive services include, for example, electronic programming guides (EPGs), high-speed internet access, interactive advertising, telephony, and email services. These interactive services can also encompass such television services as Pay Per View, TV Commerce, Video On Demand, Near Video On Demand and Audio On Demand services. In this environment, the receivers 105 are satellite receivers. Satellite receivers are typically resident in "set top boxes," also known as Integrated Receiver/Decoders (IRDs).

In broadcast applications, continuous mode receivers 105 are widely used. Codes that perform well in low signal-to-noise (SNR) environments are at odds with these receivers 105 with respect to synchronization (e.g., carrier phase and carrier frequency). Physical layer header and/or pilot symbols can be used for such synchronization. Accordingly, an important consideration with respect to system performance is that of co-channel interference on physical layer header and/or pilot symbols. Because physical layer header and/or pilots are used for acquiring and/or tracking carrier phase and carrier frequency, such interference can degrade receiver performance.

Many digital broadcast systems 100 require use of additional training symbols beyond that of the normal overhead bits in a frame structure for their synchronization processes. The increase in overhead is particularly required when the Signal-to-Noise (SNR) is low; such an environment is typical when high performance codes are used in conjunction with high order modulation. Traditionally, continuous mode receivers utilize a feedback control loop to acquire and track carrier frequency and phase. Such approaches that are purely based on feedback control loops are prone to strong Radio Frequency (RF) phase noise and thermal noise, causing high cycle slip rates and an error floor on the overall receiver performance. Thus these approaches are burdened by increased overhead in terms of training symbols for certain performance target, in addition to limited acquisition range and long acquisition time. Further, these conventional synchronization techniques are dependent on the particular modulation scheme, thereby hindering flexibility in use of modulation schemes.

In system 100, the receivers 105 achieve carrier synchronization by examining the preambles, headers, and/or unique scrambling codes or unique words (UW) that are embedded in broadcast data frame structures (shown in FIG. 4A), thereby reducing the use of additional overhead specifically designated for training purposes. The receivers 105 are more fully described below with respect to FIG. 3.

In this discrete communications system 100, the transmission facility 101 produces a discrete set of possible messages representing media content (e.g., audio, video, textual information, data, etc.); each of the possible messages has a corresponding signal waveform. These signal waveforms are attenuated, or otherwise altered, by communications channel 103. To combat the noise in the broadcast channel 103, the transmission facility 101 utilizes forward-error-correction codes, such as Low Density Parity Check (LDPC) codes, or a concatenation of different FEC codes.

The LDPC or other FEC code or codes that are generated by the transmission facility 101 facilitate high speed implementation without incurring any performance loss. These structured LDPC codes output from the transmission facility 101 avoid assignment of a small number of check nodes to the bit nodes already vulnerable to channel errors by virtue of the modulation scheme (e.g., 8PSK). Such LDPC codes have a parallelizable decoding process (unlike turbo codes), which advantageously involves simple operations such as addition, comparison and table look-up. Moreover, carefully designed LDPC codes do not exhibit any sign of error floor, e.g., there is no decrease in errors even though the signal-to-noise ratio increases. If an error floor were to exist, it would be possible to use another code, such as a Bose/Chaudhuri/Hocquenghem (BCH) code or other codes, to significantly suppress such error floor.

According to one embodiment of the present invention, the transmission facility 101 generates, using a relatively simple encoding technique as explained below in FIG. 2, LDPC codes based on parity check matrices (which facilitate efficient memory access during decoding) to communicate with the satellite receiver 105.

Transmitter Functions

Figure 2B:
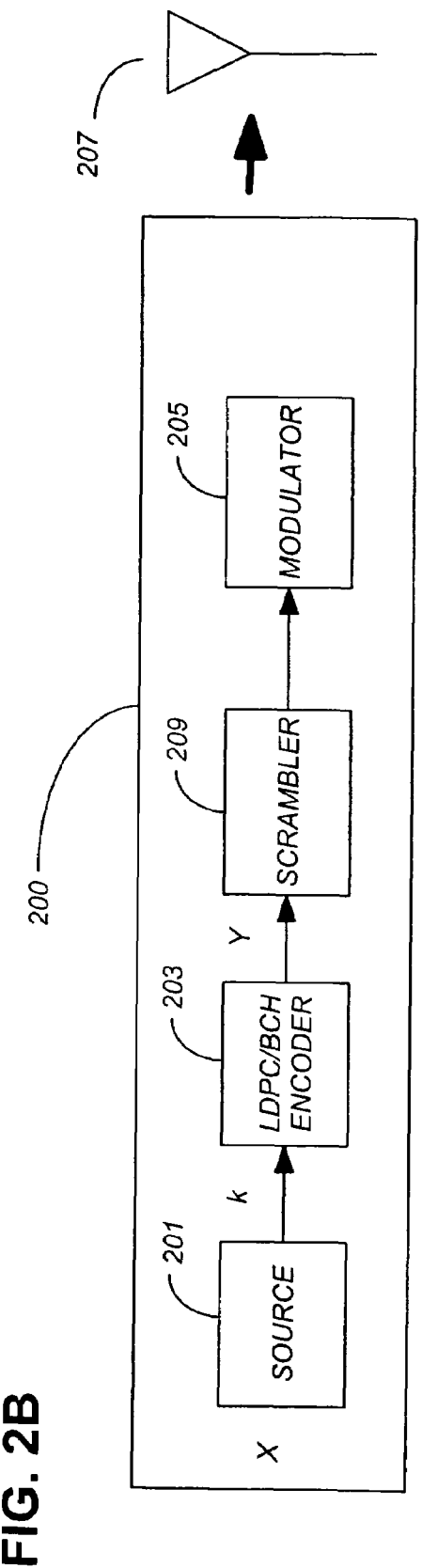
FIG. 2B is a diagram of an exemplary transmitter employed in the digital transmission facility of the system of FIG. 2A.

FIG. 2B is a diagram of an exemplary transmitter employed in the digital transmission facility of the system 100 of FIG. 2A. A transmitter 200 in transmission facility 101 is equipped with an LDPC/BCH encoder 203 that accepts input from an information source 201 and outputs coded stream of higher redundancy suitable for error correction processing at the receiver 105. The information source 201 generates k signals from a discrete alphabet, X. LDPC codes are specified with parity check matrices. Encoding LDPC codes requires, in general, specifying the generator matrices. BCH codes are included to reduce the error floor of system 20, which improves error correction performance.

Encoder 203 generates signals from alphabet Y to a modulator 205, using a simple encoding technique that makes use of only the parity check matrix by imposing structure onto the parity check matrix. Specifically, a restriction is placed on the parity check matrix by constraining certain portion of the matrix to be triangular. Such a restriction results in negligible performance loss, and therefore, constitutes an attractive trade-off.

Scrambler 209 scrambles the FEC encoded symbols in accordance with the present invention to minimize co-channel interference, as will be more fully described below.

Modulator 205, maps the scrambled messages from scrambler 209 to signal waveforms that are transmitted to a transmit antenna 207, which emits these waveforms over the communication channel 103. The transmissions from the transmit antenna 207 propagate to a demodulator, as discussed below. In the case of a satellite communication system, the transmitted signals from the antenna 207 are relayed via a satellite.

Demodulator

Figure 3:
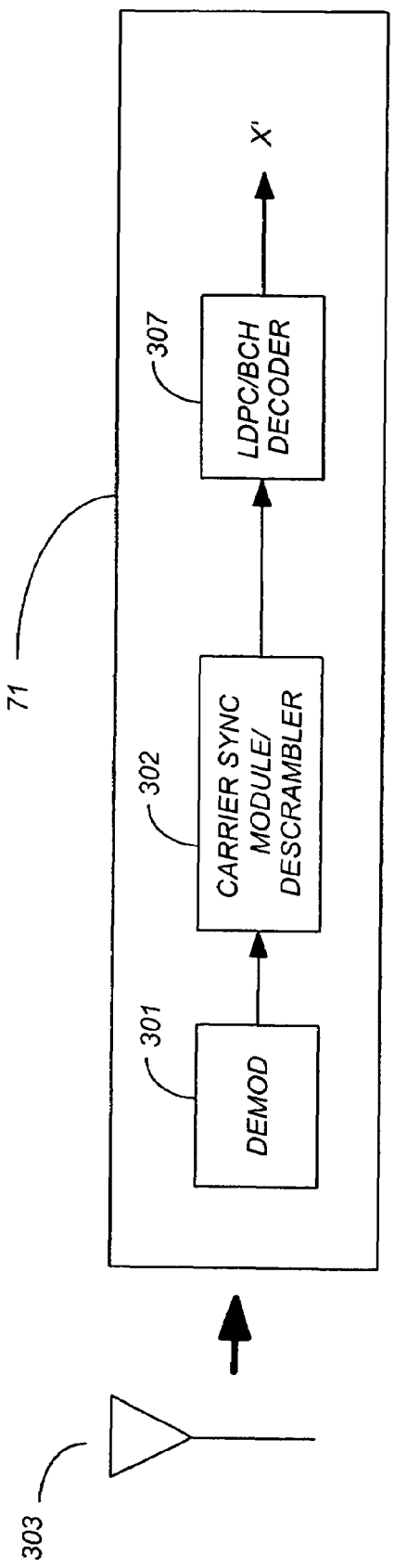
FIG. 3 is a diagram of an exemplary demodulator in the system of FIG. 2A.

FIG. 3 is a diagram of an exemplary demodulator/FEC decoder 71 in the system of FIG. 1. The demodulator/FEC decoder 71 comprises a demodulator 301, a carrier synchronization module/descrambler 302, and a LDPC/BCH decoder 307 and supports reception of signals from the transmitter 200 via antenna 303. According to one embodiment of the present invention, the demodulator 301 provides filtering and symbol timing synchronization of the LDPC encoded signals received from antenna 303, and carrier synchronization module 302 provides frequency and phase acquisition and tracking and descrambling of the signals output from the demodulator 301. After demodulation, the signals are forwarded to a LDPC decoder 307, which attempts to reconstruct the original source messages by generating messages, X'.

With respect to the receiving side, if both the desired and interfering carriers use the same modulation and coding configuration (or mode), when the frame header (shown in FIG. 4A) are aligned exactly in time while their relative frequency offset are small, the interference can cause significant errors in phase estimation for the demodulator. As a result, the demodulator can put out errors periodically. This condition occurs when frequency and symbol clock of the signals in question are sufficiently close, although they may be drifting with respect to each other.

Frame Structure

Figure 4A:
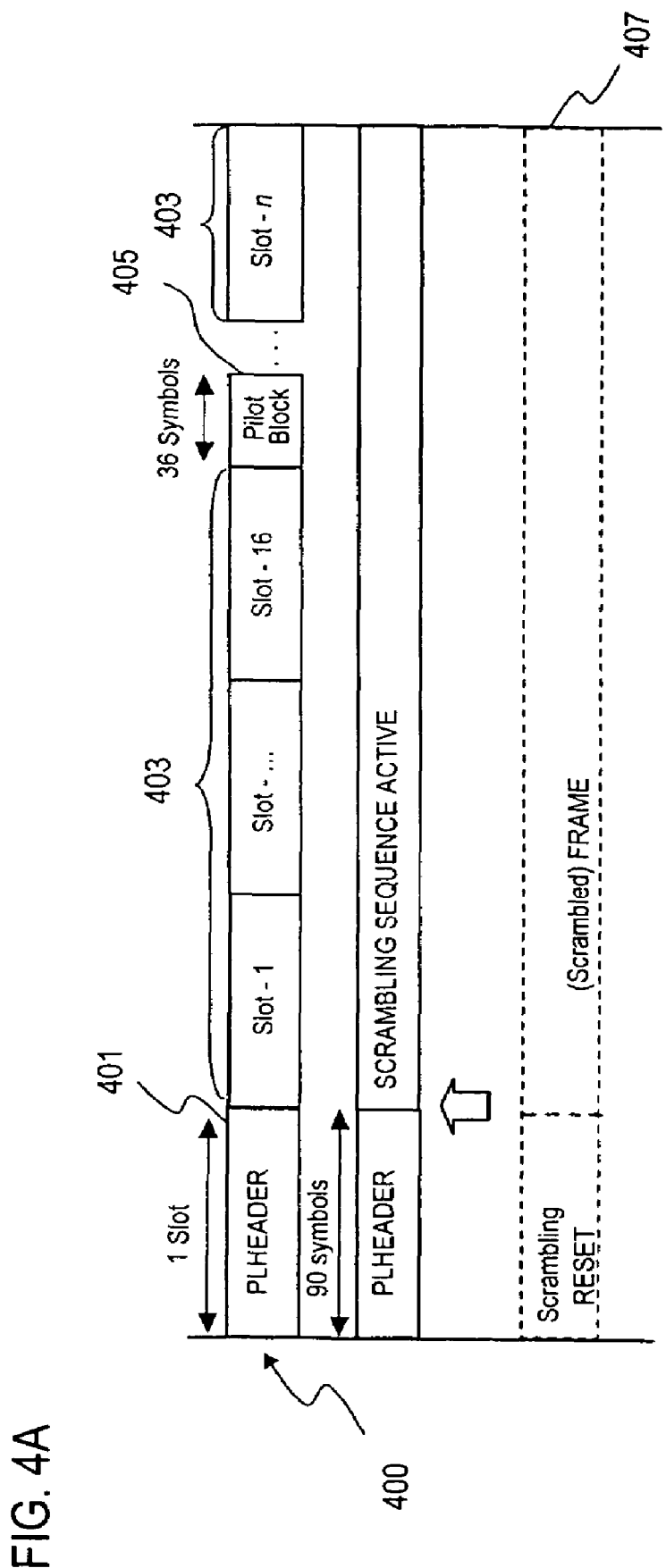
FIGS. 4A and 4B are diagrams, respectively, of a frame structure used in the system of FIG. 2A, and of logic for scrambling the frame headers with different Unique Words (UWs) for respective frames transmitted over adjacent co-channels, in accordance with an embodiment of the present invention.

FIG. 4A is a diagram of an exemplary frame structure used in the system of the present invention. By way of example, an LDPC coded frame 400, which can support, for example, satellite broadcasting and interactive services, is shown. The frame 400 includes a Physical Layer Header (denoted "PL Header") 401 and occupies one slot, as well as other slots 403 for data or other payload. In addition, the frame 400, according to one embodiment of the present invention, utilizes a pilot block 405 after every 16 slots to aid synchronization of carrier phase and frequency. It is noted that the pilot blocks 405 are optional. Although shown after 16 slots 403, the pilot block (or pilot sequence) 405, which can represent a scrambled block, can be inserted anywhere along the frame 400.

In an exemplary embodiment, the pilot insertion process inserts pilot blocks every 1440 symbols. Under this scenario, the pilot block includes 36 pilot symbols. For instance, in the physical layer frame 400, the first pilot block is thus inserted 1440 payload symbols after the PL Header 401, the second pilot block is inserted after 2880 payload symbols, and etc. If the pilot block position coincides with the beginning of the next PL Header 401, then the pilot block 405 is not inserted.

The carrier synchronization module 302 (FIG. 3), according to an embodiment of the present invention, utilizes the PL Header 401 and/or pilot block 405 for carrier frequency and phase synchronization. The PL Header 401 and/or pilot block 405 may be used for carrier synchronization, i.e., for assisting with the operation of frequency acquisition and tracking, and phase tracking loop. As such, the PL Header 401 and pilot block 405 are considered "training" or "pilot" symbols, and constitute, individually or collectively, a training block.

Each PL header 401 typically comprises a Start Of Frame (SOF) section comprising 26 symbols, and a Physical Layer Signaling Code field (PLS code) field comprising 64 symbols. Typically, the SOF section is identical for all PL headers 401 for all of the signals being transmitted without further scrambling.

For QPSK, 8PSK, and other modulations, the pilot sequence 405 is a 36-symbol long segment (with each symbol being $(1+j)/\sqrt{2}$); that is, 36 symbols (PSK). In the frame 400, the pilot sequence 405 can be inserted after 1440 symbols of data. Under this scenario, the PL Header 401 can have 64 possible formats depending on the modulation, coding and pilot configuration.

When the PL headers 401 of the interfering carrier and the desired carrier (i.e., co-channels) are aligned in time, the coherent contribution from the interfering PL Header 401 can introduce significant phase error, causing unacceptable degradation in performance. Likewise, if both co-channels use pilot symbols (with both using the same Gold code sequence for the pilot blocks 405), the pilot blocks 405 will be scrambled exactly the same way such that the coherent contribution of the pilot block in the interfering carrier (or co-channel) is still problematic.

To mitigate the effect of co-channel interference, the frame 400 is scrambled, in pilot mode. In general, in this mode, the non-header portion 407 is scrambled with a Gold code sequence unique to the transmitter. However, in a broadcast mode, the entire frame 400, including the pilot block 405, is scrambled using a common code; e.g., all the receivers 105 are supplied with the same Gold sequence. The scrambling process is further explained with respect to FIGS. 4B, 5, 6, 8 and 9. As used herein, the scrambled pilot sequence is also denoted as a "pilot-segment" of the frame 400.

I And Q Swapping

Figure 4B:
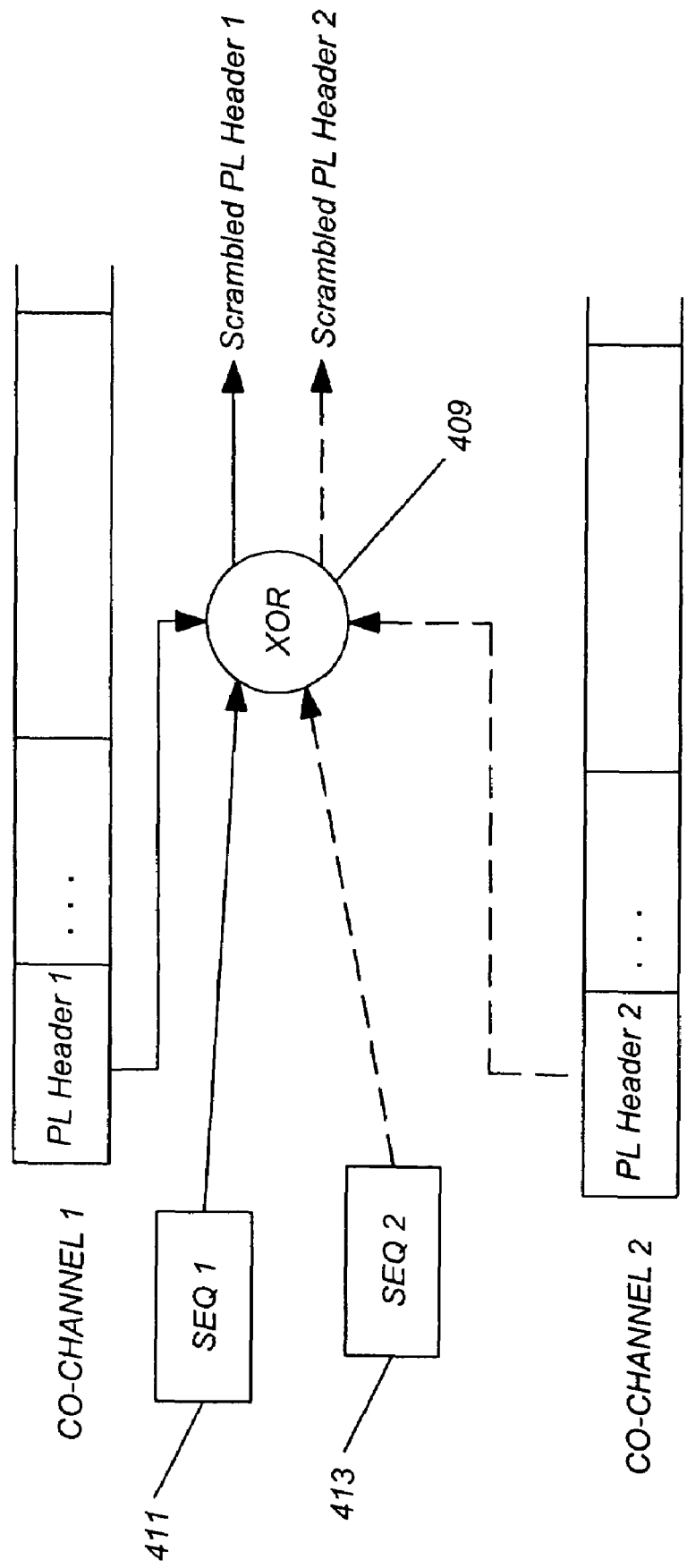

Another method that can be used in accordance with the present invention is to swap the in-phase (I) and quadrature phase (Q) portions of one signal while leaving the co-channel phases intact. Such a phase swap will destroy phase coherence in the co-channel data frames 400, which minimizes or prevents interference between the two data frames 400 in the co-channels, Applying Different Scrambling Codes to the PL Header As seen in FIG. 4B, to reduce the impact of co-channel interference, several different Unique Word (UW) patterns of the same length as the PL header 401 can be utilized for the respective co-channels to scramble the PL headers 401. For example, an eXclusive-OR (via an XOR logic 409) of the different UW patterns 411, 413 with the PL HEADER 401 can be performed for the desired and interfering carriers (i.e., co-channels). Under this approach, power associated with the PL Header 401 of the interfering carrier no longer adds coherently to the PL Header 401 of the desired carrier.

Although the frame 400 is described with respect to a structure that supports satellite broadcasting and interactive services (and compliant with the Digital Video Broadcast (DVB)—S2 standard), it is recognized that the carrier synchronization techniques of the present invention can be applied to other frame structures.

Further, individual PL headers 401 can be scrambled prior to attaching the PL header 401 to the frame 400, and individual PL headers 401 can be scrambled without other PL headers 401 being scrambled. The invention envisions selecting scrambling codes (or seeds to generate the scrambling codes), or, alternatively, selecting no scrambling code, based on the expected co-channel interference between two data frames 400. The PL headers can be again scrambled as part of the data frame 400 scrambling as shown in FIG. 5, or otherwise encrypted using an encryption schema.

The codes 411 and 413 that are used to scramble the PL header 401 can be Gold codes as described herein, other seeded codes, or other coding schemes, without departing from the scope of the present invention. Such codes, or seeds for such codes, can be selected from a limited number of codes or seeds, and such codes or seeds can be sent to receiver 64 for use in descrambling the data frames 400 to demodulate and descramble the frames 400. The limited number of codes or seeds can be selected based on a number of factors, including the number of satellites 32, or the number of expected co-channel interferences in communication system 100.

Co-Channel Scrambling

Figure 5:
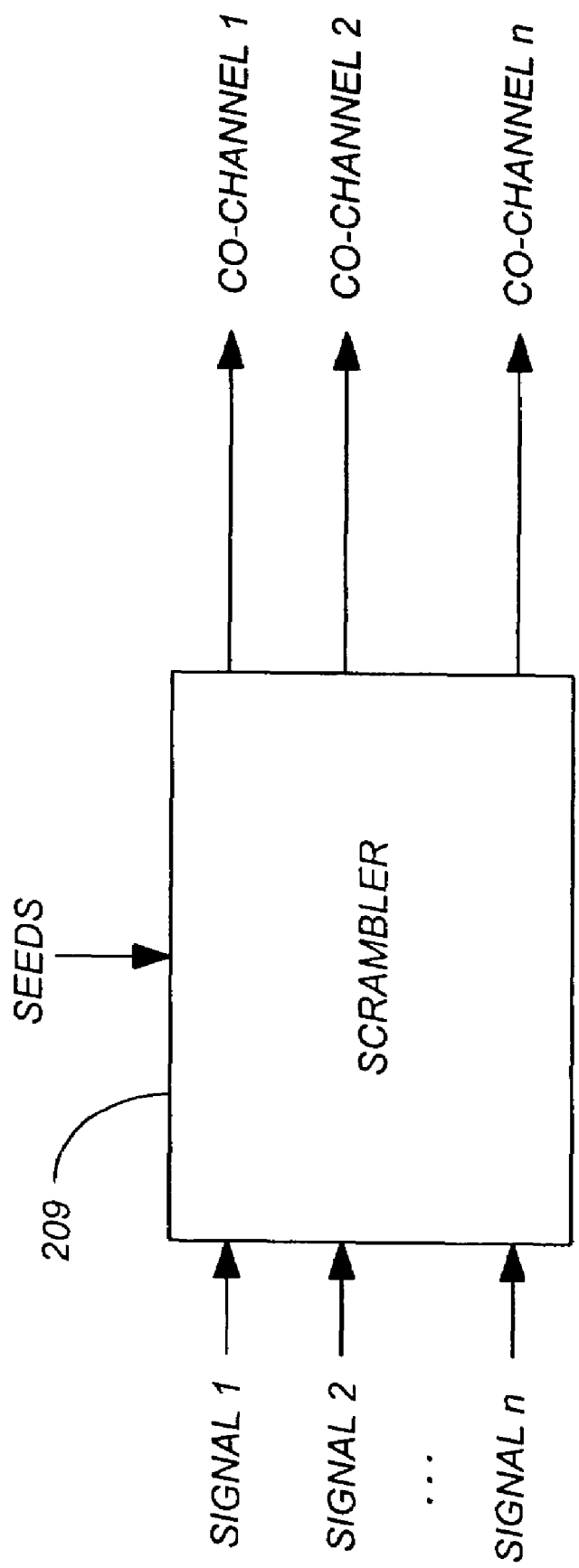
FIG. 5 is a diagram of a scrambler for isolating co-channel interference according to various embodiments of the present invention.

FIG. 5 is a diagram of a sequence scrambler for isolating co-channel interference, according to an embodiment of the present invention. A scrambling code is a complex sequence that can be constructed from a Gold code, according to one embodiment of the present invention. That is, a scrambler 209 generates a scrambling sequence Rn(i). Table 1 defines how the scrambling sequence Rn(i) scrambles the frame using the scrambler 209, according to the scrambler sequence generator of FIG. 6. In particular, Table 1 shows the mapping of an input symbol to an output symbol based on the output of the scrambler 209.

Table 1

| Rn(i) | Input(i) | Output(i) |
|---|---|---|
| 0 | I + jQ | I + jQ |
| 1 | I + jQ | −Q + jI |
| 2 | I + jQ | −I − jQ |
| 3 | I + jQ | Q − jI |

Using different seeds for either of such two m-sequence generators can generate different Gold sequences. By using different seeds for different services, the mutual interference can be reduced.

In a broadcast mode, the 90 symbol physical layer header 401 can remain constant for a particular physical channel. The Gold sequence is reset at the beginning of each frame, and thus, the scrambled pilots are periodical as well with a period equal to the frame length. Because the information carrying data in a frame varies and appears to be random, the co-channel interference is random and degrades the operating signal-to-noise ratio. Without using this scheme, due to the nature of time-invariance of the original physical layer header 401 and the pilot block 405, the carrier and phase estimation will be skewed for a receiver depending on these pilots and physical layer header for such acquisition and tracking. This will degrade the performance beyond those of signal-to-noise ratio degradation associated with random data.

The scrambler 209 utilizes different scrambling sequences (n in FIG. 6) to further isolate the co-channel interference. One scrambling sequence is provided for the physical layer header and one for the pilots. Different pilots are specified in terms of different seeds from the n value of the Gold sequences.

As such, the present invention contemplates separate scrambling of several combinations of PL headers 401, pilot blocks 405, and payload 403 for co-channel interference mitigation. Depending on the complexity of the system, the PL headers 401 and pilot blocks 405 (if present) for a given channel can be scrambled using a different code than the co-channel without scrambling the payload 403. In essence, all non-payload 403 symbols that are present in one channel 400 are scrambled using one code, and all non-payload 403 symbols in another channel 400 are scrambled using a different code.

Further, the PL headers 401 and pilot blocks 405 (if present) for two different channels can be scrambled using different scrambling codes, and the payloads 403 for those channels can be scrambled using other codes. For example, a first scrambling sequence can be applied to a first PL header 401, and a second scrambling sequence can be applied to a second PL header 401. The first payload 403 has a third scrambling sequence applied (typically a Gold code), and the second payload has a fourth scrambling sequence applied (also typically a Gold code).

It is also contemplated within the present invention that there can be systems that use mated pairs of codes for the PL header 401 and the payload 403. So, a given scrambling code used on a PL header 401 is always used with a scrambling code used to scramble the payload 403 for that PL header 401. These code pairs can be applied to any signal 400, and can be re-assigned from one signal 400 to another signal 400 as desired.

It is also contemplated within the scope of the present invention that each payload 403 signal within system 20 receives a unique scrambling code. Further, each PL header 401 can receive a unique scrambling code, which can be mated with scrambling codes for the payloads 403 if desired.

Although described as a single scrambling sequence for a given channel 400, the present invention also contemplates that scrambling sequences can be changed or rotated after a given number of frames have been transmitted. The scrambling sequences for the PL header 401, the payload 403, or both can be rotated on a random or periodic basis as desired without departing from the scope of the present invention.

Gold Sequence Generator Diagram

Figure 6:
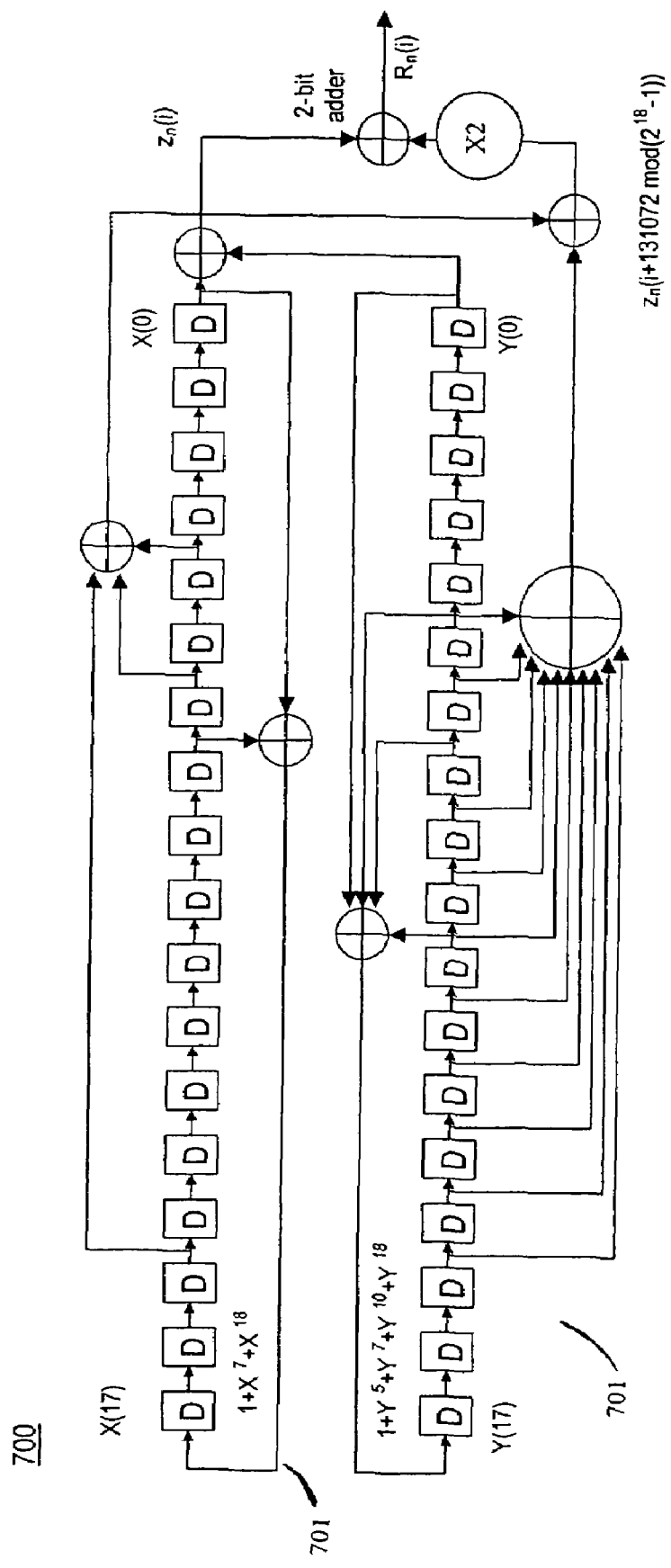
FIG. 6 is a diagram of an exemplary scrambling sequence generator used in the scrambler of FIG. 5.

FIG. 6 is a diagram of an exemplary scrambling sequence generator used in the scrambler of FIG. 5. Although a Gold sequence generator is shown in FIG. 6, other sequence generators can be used within the present invention without departing from the scope of the present invention. By using different sequences for the co-channels, i.e., different initialization seeds for each of the co-channels, the interference can be mitigated. In this example, a Gold sequence generator 700 employs the preferred polynomials of $1+X^7+X^{18}$ and $1+Y^5+Y^7+Y^{10}+Y^{18}$. For example, to sustain n co-channels, in an exemplary embodiment of the present invention, the seeds can be programmed into an m-sequence generator 701. The polynomials are initialized based on the given seed for that co-channel. The seeds are generated, according to one embodiment of the present invention, using a search algorithm that minimizes the worst cross-correlation between every pair of the co-channel pilot-segments.

Generating Different PL Sequences

Figure 8:
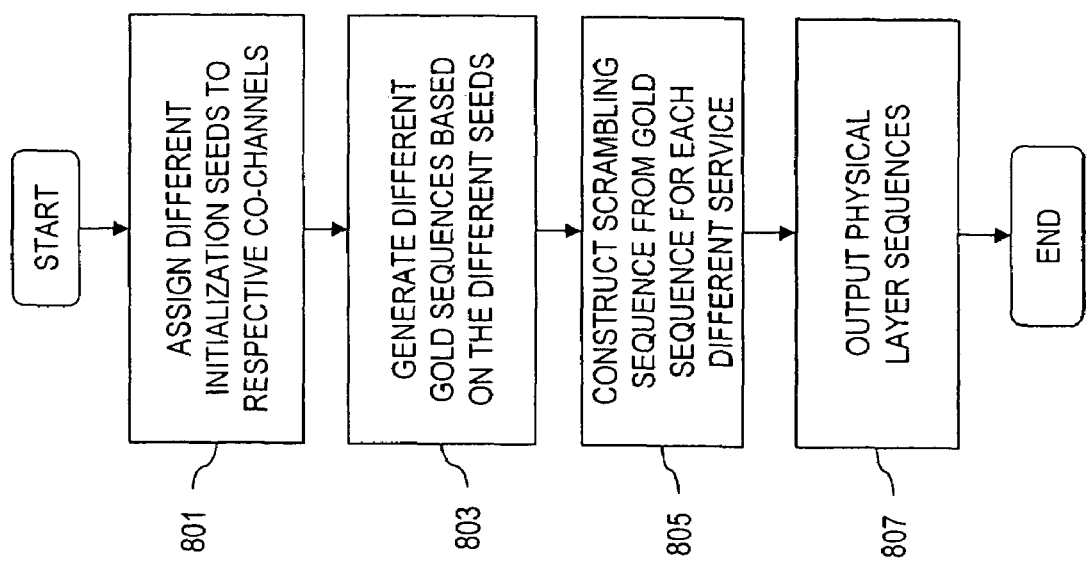
FIG. 8 is a flowchart of a process for generating different physical layer sequences, according to an embodiment of the present invention.

FIG. 8 is a flowchart of a process for generating different physical layer sequences, according to an embodiment of the present invention. In step 801, different initialization seeds are assigned to the respective co-channels. Next, Gold sequences are generated based on the seeds, per step 803. A scrambling sequence is then constructed, as in step 805, from the Gold sequence for each different service. In step 807, the physical layer sequences are output by the scrambler 209.

The present invention can use different initialization seeds for each of the channels, and, thus, any pilot signals 405 in each signal will contain different symbols, which greatly reduces cross-correlation between two interfering co-channels. Once the pilot symbols 405 are distinguishable, the demodulator 71 can track one data frame 400 based almost entirely on the pilot symbols 405, which minimizes the interference between the data frames 400.

Figure 9:
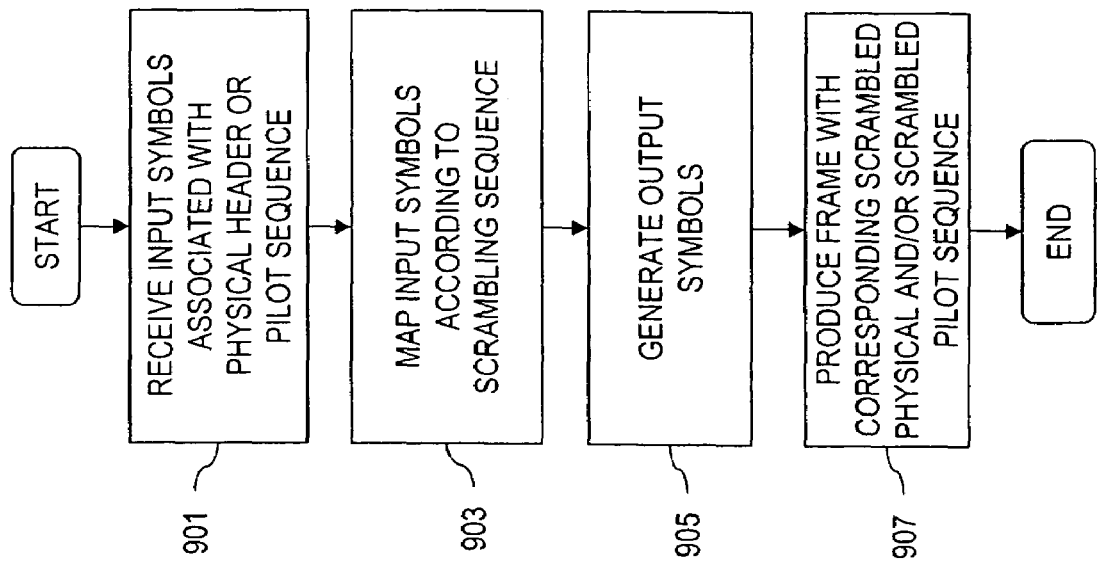
FIG. 9 is a flowchart of process for generating scrambled physical headers, according to an embodiment of the present invention.

FIG. 9 is a flowchart of process for generating scrambled physical headers, according to an embodiment of the present invention. The transmitter 200 (of FIG. 2A) receives input symbols associated with the physical header or pilot sequence, as in step 901. In step 903, the transmitter maps the input symbols according to a scrambling sequence generated by the scrambler 209. The output symbols are then generated, per step 905. Thereafter, the transmitter outputs a frame with a scrambled physical and/or scrambled pilot sequence (step 907).

Figure 10:
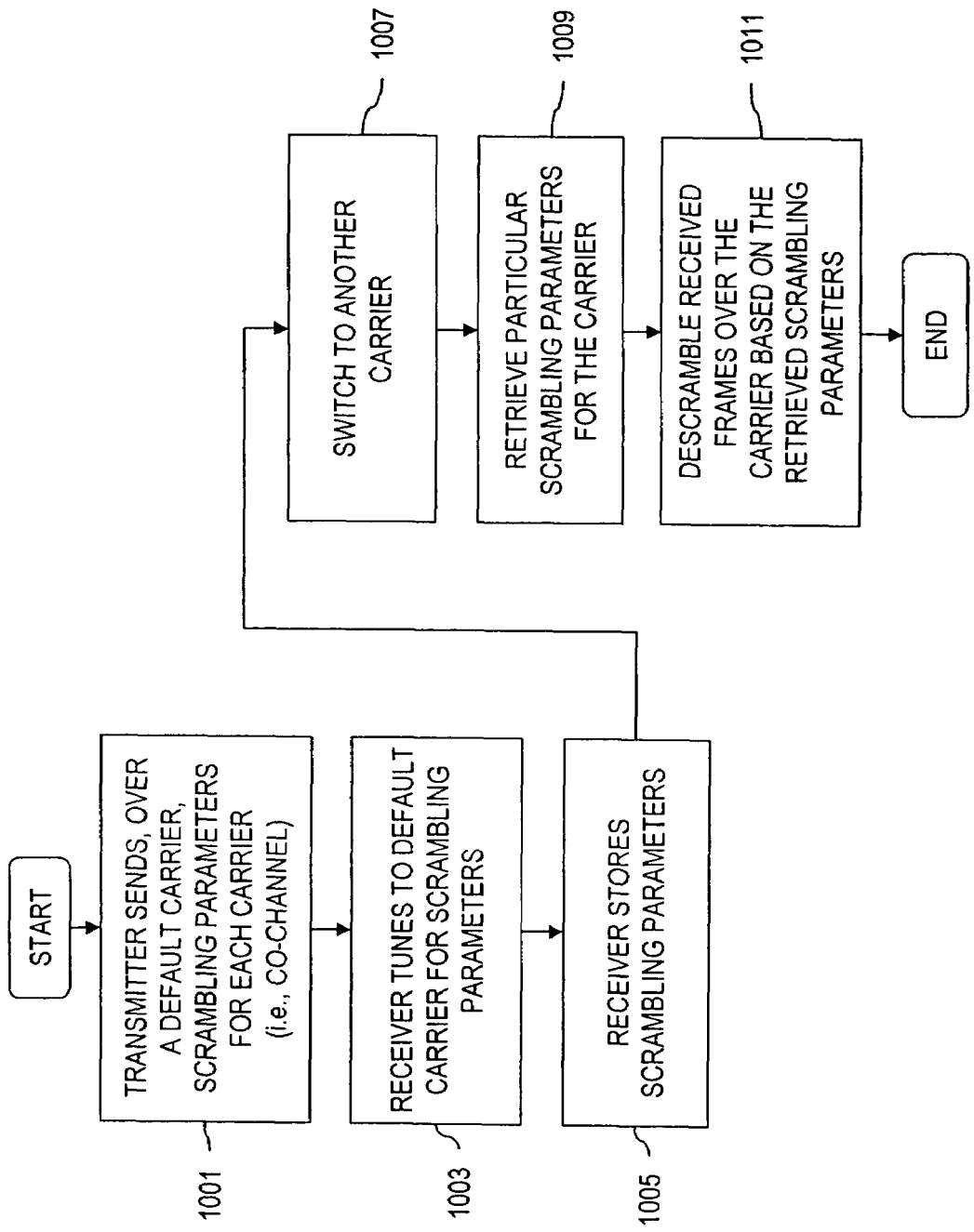
FIG. 10 is a flowchart of process for transmitting scrambling parameters, according to an embodiment of the present invention.

FIG. 10 is a flowchart of process for transmitting scrambling parameters, according to an embodiment of the present invention. As discussed above, for the pilot mode, different Gold sequences are employed for different services to reduce co-channel interference. In addition, use of different UW patterns of the same length as the header 401 can minimize coherent addition of the headers 401. Consequently, a receiver needs the appropriate UW to unscramble the PL Header 401, as well as the appropriate Gold sequence to unscramble the payload data and the pilot block.

In step 1001, the transmitter (e.g., transmitter 200) sends scrambling parameters for each of the supported carriers (co-channels) to receiver 64. This is typically done by embedding the scrambling parameters into the Advanced Program Guide (APG) portion of payload 403, which is available on at least one transponder from satellites 32. Typically, the APG portion of payload 403 is available on every transponder from satellites 32, and receiver 64 can be directed to receive the APG on a specific transponder on startup if such a direction to receiver 64 is necessary. Further, the transmitter 200 can use other methods for transmitting the scrambling codes, such as via telephone lines that interact with receiver 64 via interface 82. According to one embodiment of the present invention, the scrambling parameters include an index of the scrambling codes, and the scrambling sequence number for each carrier or channel. The default carrier supports a frame whose PL Header 401 is not scrambled and the payload data 403 (and pilot block 405 if any) are scrambled by a default Gold sequence, e.g., Sequence No. 0. The receiver 65, as in step 1003, initially tunes to this carrier to obtain the scrambling parameters, and stores the scrambling parameter sets for all carriers to be received (per step 1005). When the receiver switches to another carrier, as in step 1007, the particular scrambling parameters for the carrier are retrieved, per step 1009. In particular, the stored index is retrieved to find the correct UW as well as the stored Gold sequence number. In step 1011, the frames received over the particular carrier are descrambled appropriately.

Figure 11:
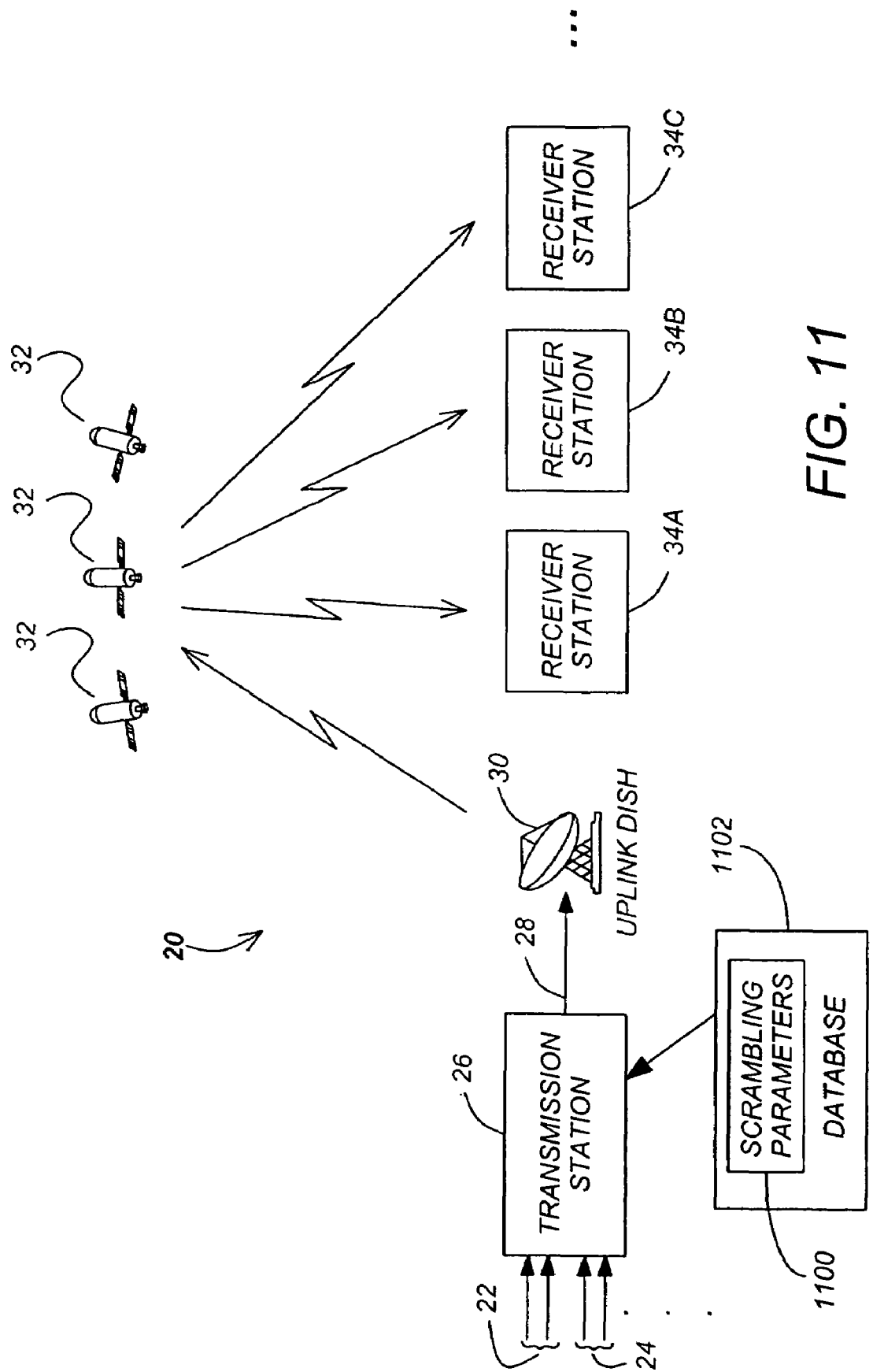
FIG. 11 is a diagram showing various embodiments of the present invention for managing scrambling parameters.

FIG. 11 is a diagram showing various embodiments of the present invention for managing scrambling parameters. In this example, a satellite system 20 includes a transmission station 26 that stores the scrambling parameters 1100 in external memory, i.e., a database 1102, for all carriers utilized in the system 20. The scrambling parameters can be conveyed to receiver stations 34A-34C via satellites 32 using two approaches.

Under the first approach, the receiver 34 maintains all sets of scrambling parameters that correspond to the carriers that is assigned to the receiver 34. In this manner, the transmission station 26 need only indicate the particular entry associated with the proper set of scrambling parameters for the receiver 34 to use for a particular carrier. An update command only indicates the indices for these UW and Gold sequence number in the database 1102 of the receiver 34.

Figure 12:
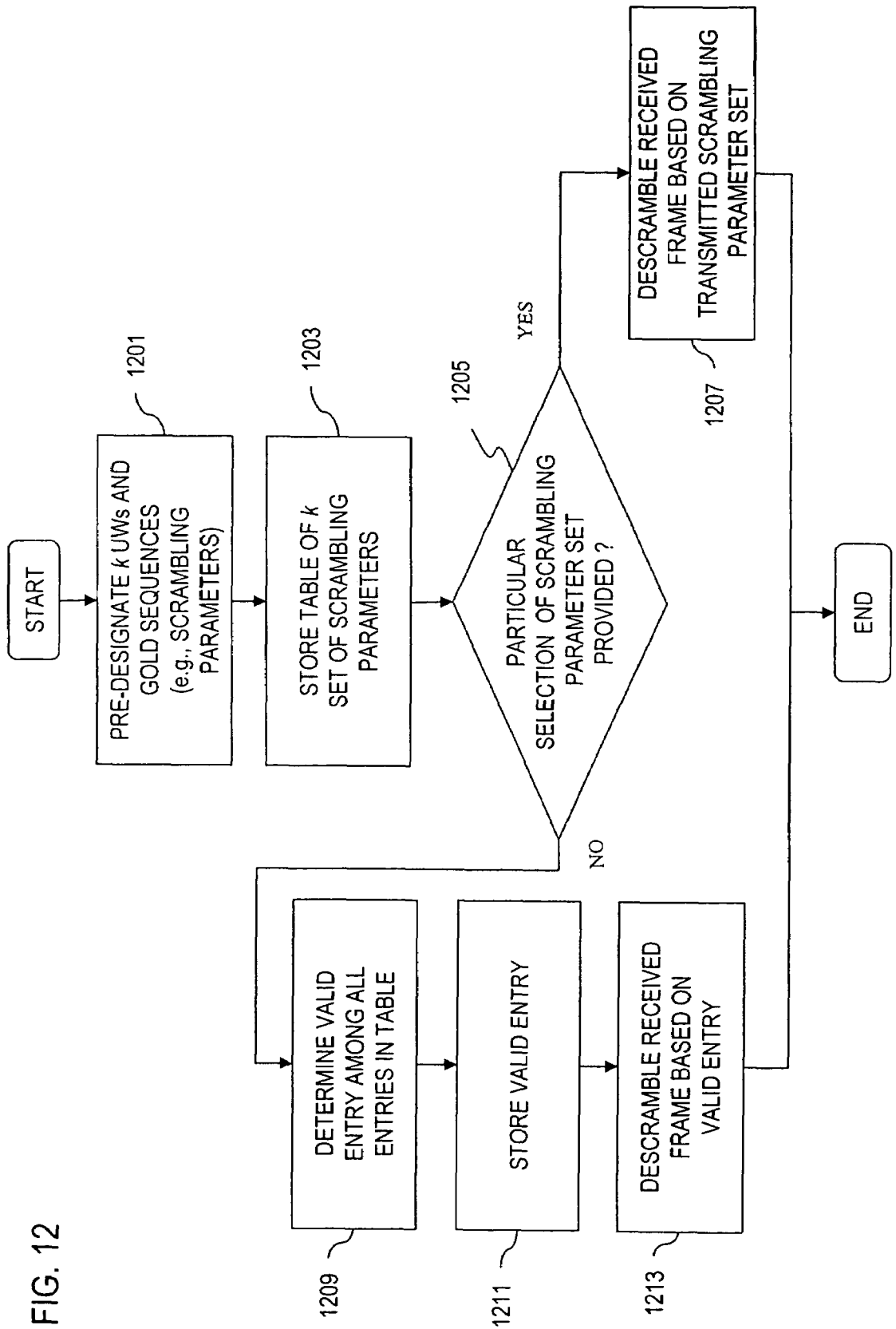
FIG. 12 is a flowchart for descrambling received frames based on pre-designated sets of scrambling parameters, according to an embodiment of the present invention.

The second approach employs a caching mechanism for pre-selected or pre-designated scrambling parameter entries, as explained in FIG. 12. As such, the receiver 34 includes a memory 78 to store the pre-designated set of parameters.

FIG. 12 is a flowchart for descrambling received frames based on pre-designated sets of scrambling parameters, according to an embodiment of the present invention. With this approach, k sets of scrambling parameters corresponding to the carriers to be used by the receiver 34 are pre-selected or pre-designated, as in step 1201. In other words, only k pre-selected UWs and k Gold sequence numbers are stored in a table. The value of k can be configured according to the size of the memory 78. As a result, the transmission station 26 need only transmit $2\log_2 k$ bits for each carrier. Further, if a fixed association between UW and Gold sequence number is maintained, the number of transmitted bits can be further reduced—one $\log_2 k$ bit number for each carrier. The receiver 34, thus, stores only k sets of scrambling parameters in the memory 78, per step 1203.

With this "cache" concept, the receiver 34 need not be instructed as to a particular set of scrambling parameter by the transmission station 26. At this point, if the receiver 34 determines that the transmission station 26 has indicated such instruction, per step 1205, the receiver 34 retrieves the appropriate scrambling parameter from the memory 78 and descrambles frames received over the specific carrier, as in step 1207.

Alternatively, the receiver 34 can, itself, determine a valid entry, as in step 1209, in the scrambling parameter table within the memory 78, assuming that k is sufficiently small as to not overburden the processing capability of the receiver 34. The receiver 34 can execute a search procedure to step through all the possible k pre-selected sets of UW and Gold sequence numbers stored in the memory 78, without receiving these parameters via a default carrier, when the receiver first tunes to a particular carrier. Once the valid or correct set of UW and Gold sequence number is found for a particular carrier after the search, the information can be stored, per step 1211, in the memory 78 for this carrier. This information is then utilized to descramble the frame (step 1213). Consequently, this valid set of scrambling parameters is used in the future without further search when needed.

Under the above approach, great flexibility is afforded to how the scrambling parameters are conveyed to the receiver 34. The transmission station 26 can update the limited k UW and Gold sequence number sets through over-the-air programming. While there are k internal sets of UW and Gold sequence numbers stored in the memory 78 of the receiver 34, each of the sets can be replaced under remote command by the transmission station 26 with a new UW and Gold sequence number. For example, in a cache update over-the-air, a full length of the UW, and the Gold sequence number (e.g., 18-bits) along with the index is transmitted.

The processes of FIGS. 8-10 and 12 advantageously provide reduced co-channel interference, thereby enhancing receiver performance. These processes can be implemented as software and/or hardware, as explained in FIG. 13.

Alternate Shift Key Modes

Another method of the present invention is to use different shift key modes within each of the data frames 400. Typically, a QPSK transmission mode will be more resistant to PL header 401 interference effects than an 8PSK transmission mode. As such, some of the data frames 400 can be transmitted in a first PSK mode, and other frames 400 can be transmitted in a second PSK mode, which will reduce the number of bits/symbols within the data frames 400 that constructively interfere. Further, individual slots 403, pilot blocks 405, or PL headers 401 can be transmitted in different PSK or ASK modes to further reduce constructive interference, and, thus, reduce or eliminate co-channel interference.

Sensing Phase Track Pull-Off

Another method in accordance with the present invention to reduce co-channel interference effects is to sense when the demodulator 71 or typically, carrier synchronization module 302 within the demodulator 71, is being abruptly or abnormally drawn away from tracking a specific phase of a given coded frame 400. Such a drawing away, or "pulling off" of the phase track would indicate the presence of the interfering data frame, and the carrier synchronization module 302 can then choose not to update the phase track from the PL header 401 or the pilot symbols 405. Although the phase of a given signal or coded frame 400 can change slowly, a reference phase track can be used by the carrier synchronization module 402 to maintain phase track of a given signal if desired.

As such, the present invention can use carrier synchronization module 302 to determine the presence of an interfering coded frame 400, and can either choose to update the carrier synchronization module 302 phase tracking information, or to ignore the phase tracking information, to allow carrier synchronization module 302 to track the already acquired carrier frequency for a given coded frame 400. The carrier synchronization module 302 can use statistical models or other methods to determine how to track the phase of the desired coded frame 400 rather than follow the phase tracking information caused by the presence of the undesired and interfering coded frame 400.

Change in the SOF Sequence

The present invention also envisions that the interfering coded frames 400 can have a different Start-Of-Frame (SOF) sequence and/or scrambling code to those coded frames 400 that may be affected by such co-channel interference. Typically, the SOF is the first twenty-six bits of the ninety bit PL Header 401, but the SOF can be a larger or smaller amount of bits. Further, although changes in the SOF sequence are described, these techniques can be applied to any portion of the PL header 401 if desired. The demodulator 71 can then look for a different SOF in PL header 401 when asked to tune to one or the other of the coded frames 400, and be able to stay locked onto the desired signal and not be pulled off by co-channel interference.

Further, the different SOF sequences can be selected from a group of a limited number of SOF sequences, and this limited number of SOF sequences can be stored in receiver 64 such that receiver 64 can detect or find a specific SOF sequence in a PL header 401 when required.

Transmission Frame Timing Offset

Figure 7:
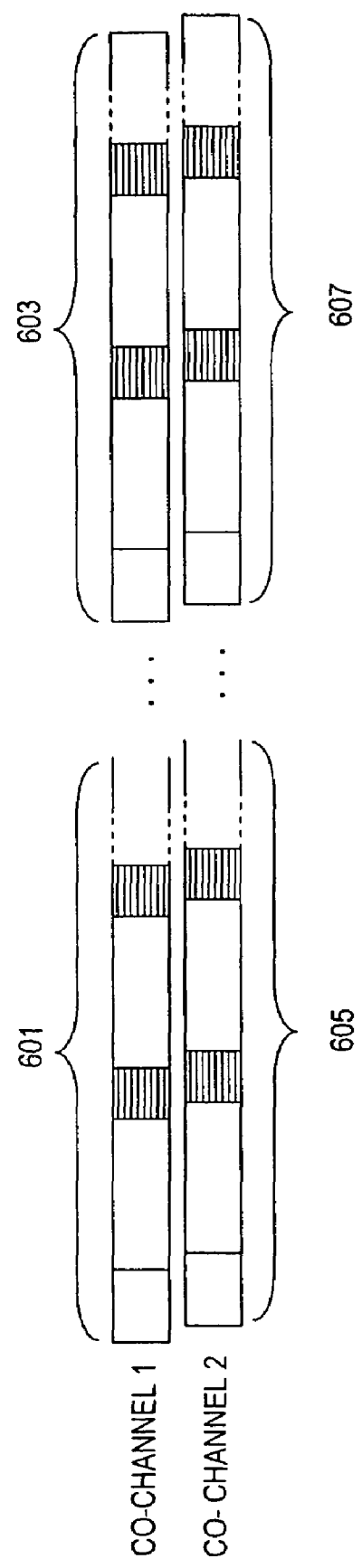
FIG. 7 is a diagram showing the periodic nature of the cross-correlation between co-channel frames, in accordance with an embodiment of the present invention.

As shown in FIG. 7, it is possible to have two frames 601, 605 offset in time. The data frames 400 can be offset in terms of time as shown in FIG. 7, e.g., one data frame 400 starts first, and the interfering data frame 400 is delayed by a certain portion of or whole number of symbols, such that the SOF portion of the PL header 401 will occur at different times for each of the data frames, and not constructively interfere with each other. This will allow the tuner 70 or demodulator 71 to know which of the data frames 400 has been received based on the known time and/or frequency offset for the data frames, or by processing the strongest signal which is presumably the wanted signal, and then demodulate the proper data frame 400. The data frames 400 can be offset by any length longer than one symbol interval.

Transmission Frequency Offset

Another method of the present invention is to offset the transmission frequency of data frames 601, 606 by a small amount, e.g., 1 MHz, so the demodulator 71 can search for the SOF portion of the PL header 401 in a different frequency space for a given data frame 400. The number of offsets, and in which direction, e.g., either up or down in terms of frequency, can be based on the number of data frames 400, or satellite 32 downlink beams, that will be present simultaneously and potentially causing the co-channel interference.

Flowchart

Figure 13:
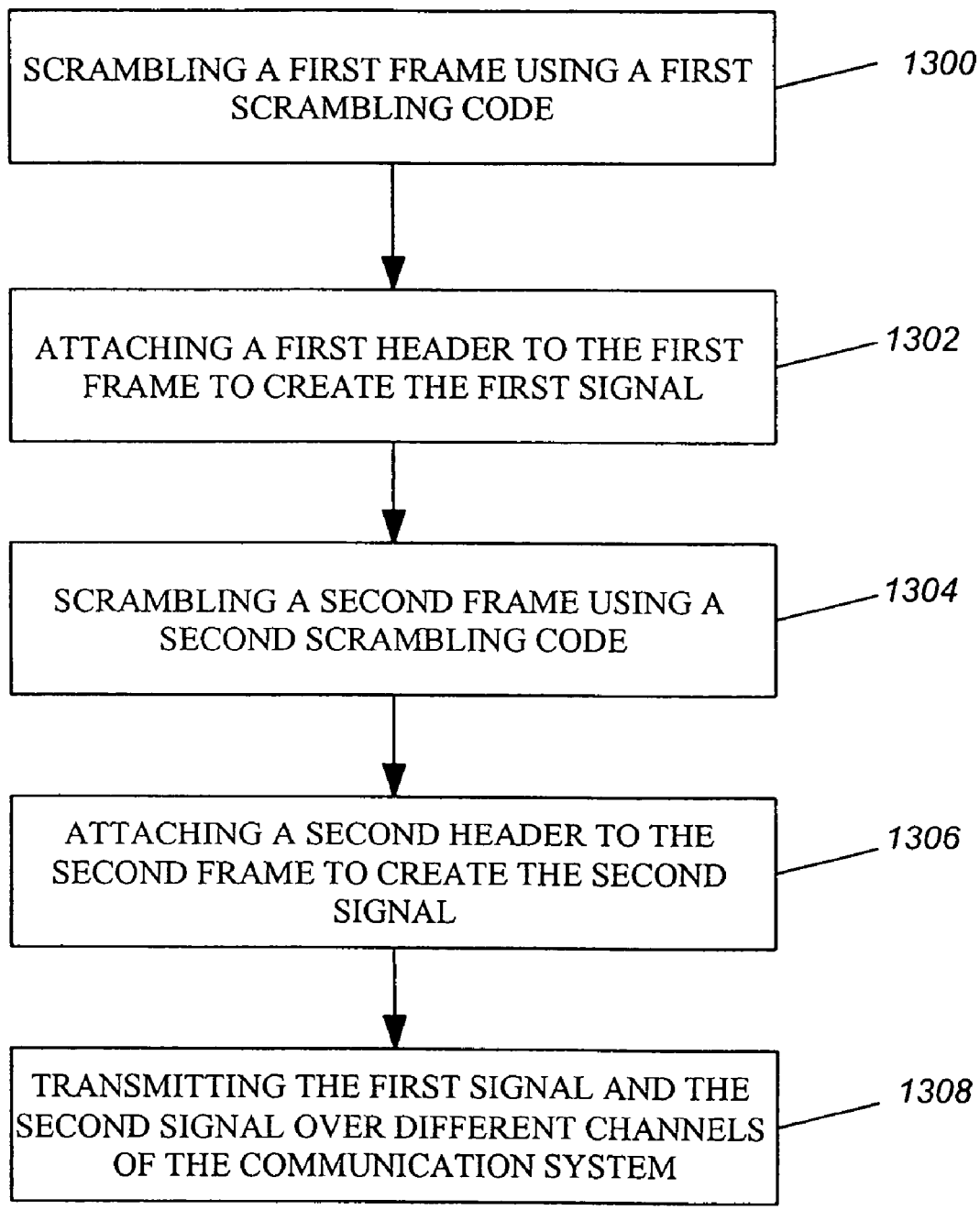
FIG. 13 is a flowchart showing the steps of the present invention.

FIG. 13 is a flowchart showing the steps of the present invention.

Box 1300 represents performing scrambling a first frame using a first scrambling code.

Box 1302 represents attaching a first header to the first frame to create the first signal.

Box 1304 represents scrambling a second frame using a second scrambling code.

Box 1306 represents attaching a second header to the second frame to create the second signal.

Box 1308 represents transmitting the first signal and the second signal over different channels of the communication system.

CONCLUSION

In summary, the present invention comprises methods and apparatuses for minimizing co-channel interference in communications systems. A method in accordance with the present invention comprises scrambling a first frame using a first scrambling code, attaching a first header to the first frame to create the first signal, scrambling a second frame using a second scrambling code, attaching a second header to the second frame to create the second signal, and transmitting the first signal and the second signal over different channels of the communication system.

Optional additional elements further include the first header being attached to the first frame prior to using the first scrambling code, the second header being attached to the second frame after scrambling the second frame using the second scrambling code, scrambling the first header using a third scrambling code and scrambling the second header using a fourth scrambling code, the first scrambling code and the second scrambling code being Gold codes, the third scrambling code and the fourth scrambling code being selected from a limited number of codes, the first header containing a first Start-Of-Frame (SOF) portion and the second header contains a second SOF portion different than the first SOF portion, the first SOF portion and the second SOF portion being selected from a limited number of SOF portions, the first frame comprising a first pilot symbol and the second frame comprising a second pilot symbol, the first pilot symbol being scrambled with the header, the first scrambling code being generated from a first seed and the second scrambling code being generated from a second seed, the first seed and the second seed being selected from a limited number of seeds, the number of seeds being determined based on a number of interfering channels within the communication system, and transmitting information associated with the first scrambling code and the second scrambling code to a receiver within the communication system. The method can also be performed by a computer-readable medium bearing instructions for minimizing co-channel interference in a communication system, said instruction, being arranged, upon execution, to cause one or more processors to execute the method.

An apparatus in accordance with the present invention comprises a scrambler for scrambling at least a first data frame of the first signal using a first scrambling code and for scrambling at least a second data frame of the second signal using a second scrambling code, and a transmitter for transmitting the first signal and the second signal over different channels of the communication system.

The apparatus optionally includes the first signal further comprising a first header and the second signal further comprises a second header, and the first header and the second header are also scrambled by the scrambler, the first header is scrambled using a third scrambling code and the second header is scrambled using a fourth scrambling code, the third scrambling code and the fourth scrambling code are selected from a limited number of scrambling codes, the first header containing a first Start-Of-Frame (SOF) portion and the second header contains a second SOF portion different than the first SOF portion, and the first SOF portion and the second SOF portion are selected from a limited number of SOF portions.

It is intended that the scope of the invention be limited not by this detailed description, but rather by the claims appended hereto and the equivalents thereof. The above specification, examples and data provide a complete description of the manufacture and use of the composition of the invention. Since many embodiments of the invention can be made without departing from the spirit and scope of the invention, the invention resides in the claims hereinafter appended and the equivalents thereof.

What is claimed is:

1. A method for minimizing co-channel interference in a communication system having at least a first signal and a second signal, each signal transmitted on different channels within the communication system, comprising:

scrambling a first frame using a first scrambling code;

attaching a first header to the first frame to create the first signal;

scrambling a second frame using a second scrambling code;

attaching a second header to the second frame to create the second signal; and simultaneously transmitting the first signal and the second signal, from the same transmitter, over different channels of the communication system.

2. The method of claim 1, wherein the first header is attached to the first frame prior to using the first scrambling code.

3. The method of claim 2, wherein the second header is attached to the second frame after scrambling the second frame using the second scrambling code.

4. The method of claim 1, further comprising:
scrambling the first header using a third scrambling code; and
scrambling the second header using a fourth scrambling code.

5. The method of claim 4, wherein the first scrambling code and the second scrambling code are Gold codes.

6. The method of claim 5, wherein the third scrambling code and the fourth scrambling code are selected from a limited number of codes.

7. The method of claim 1, wherein the first header contains a first Start-Of-Frame (SOF) portion and the second header contains a second SOF portion different than the first SOF portion.

8. The method of claim 7, wherein the first SOF portion and the second SOF portion are selected from a limited number of SOF portions.

9. The method of claim 1, wherein the first frame comprises a number of first pilot symbol blocks and the second frame comprises a number of second pilot symbol blocks.

10. The method of claim 9, wherein the first pilot symbol blocks are scrambled with the header.

11. The method of claim 1, wherein the first scrambling code is generated from a first seed and the second scrambling code is generated from a second seed, the first seed and the second seed being selected from a limited number of seeds.

12. The method of claim 11, wherein a number of seeds is determined based on a number of interfering channels within the communication system.

13. The method of claim 1, further comprising the step of:
transmitting information associated with the first scrambling code and the second scrambling code to a receiver within the communication system.

14. A computer-readable medium bearing instructions for minimizing co-channel interference in a communication system, said instruction, being arranged, upon execution, to cause one or more processors to perform the method of claim 1.

15. An apparatus for minimizing co-channel interference in a communication system having at least a first signal and a second signal, each signal transmitted on different channels within the communication system, comprising:
a scrambler for scrambling at least a first data frame of the first signal using a first scrambling code and for scrambling at least a second data frame of the second signal using a second scrambling code; and
a transmitter for simultaneously transmitting the first signal and the second signal from the transmitter over different channels of the communication system.

16. The apparatus of claim 15, wherein the first signal further comprises a first header and the second signal further comprises a second header, and the first header and the second header are also scrambled by the scrambler.

17. The apparatus of claim 16, wherein the first header is scrambled using a third scrambling code and the second header is scrambled using a fourth scrambling code.

18. The apparatus of claim 17, wherein the third scrambling code and the fourth scrambling code are selected from a limited number of scrambling codes.

19. The apparatus of claim 15, wherein the first header contains a first Start-Of-Frame (SOF) portion and the second header contains a second SOF portion different than the first SOF portion.

20. The apparatus of claim 19, wherein the first SOF portion and the second SOF portion are selected from a limited number of SOF portions.

* * * * *